United States Patent
Ishii et al.

(10) Patent No.: US 7,609,900 B2
(45) Date of Patent: Oct. 27, 2009

(54) MOVING PICTURE CONVERTING APPARATUS AND METHOD, AND COMPUTER PROGRAM

(75) Inventors: Takahiro Ishii, Tokyo (JP); Seiji Kobayashi, Tokyo (JP)

(73) Assignee: Sony Corporation, Tokyo (JP)

(*) Notice: Subject to any disclaimer, the term of this patent is extended or adjusted under 35 U.S.C. 154(b) by 612 days.

(21) Appl. No.: 11/445,342

(22) Filed: Jun. 2, 2006

(65) Prior Publication Data
US 2006/0280244 A1 Dec. 14, 2006

(30) Foreign Application Priority Data
Jun. 10, 2005 (JP) ............... 2005-171625

(51) Int. Cl.
G06K 9/36 (2006.01)
G06K 9/00 (2006.01)
(52) U.S. Cl. .................................................. 382/233
(58) Field of Classification Search ......... 382/232–240, 382/243–251; 375/240.01–240.27
See application file for complete search history.

(56) References Cited

U.S. PATENT DOCUMENTS

| 7,248,633 B2 * | 7/2007 | Ogura et al. | 375/240.27 |
| 2009/0028452 A1 * | 1/2009 | Kimoto | 382/238 |

FOREIGN PATENT DOCUMENTS

| JP | 2002-027466 | 1/2002 |
| JP | 2003-169284 | 6/2003 |
| JP | 2005-198268 | 7/2005 |

* cited by examiner

Primary Examiner—Sherali Ishrat
(74) Attorney, Agent, or Firm—Rader, Fishman & Grauer PLLC

(57) ABSTRACT

It is intended to restore moving-picture data whose pixels have been thinned rapidly with a small-capacity memory and with prevention of image deterioration. There is provided a moving picture converting apparatus for reconstructing an original moving picture from compressed moving-picture data, which includes an input unit to receive compressed moving-picture data including a thinned image consisting of invalid pixels and valid pixels and a forward motion vector incident to the thinned image, an intra-frame interpolator for interpolating the invalid pixels in a present frame to be restored on the basis of the valid pixels of the thinned image in the present frame to produce a padded image, and a frame rendering unit to produce a rendered image by making preceding-frame rendering to restore pixels of the padded image on the basis of valid pixels in a preceding frame and subsequent-frame rendering to restore pixels of the padded image on the basis of valid pixels in a subsequent frame, the frame rendering unit making the preceding-frame rendering to restore a pixel at an end point of tracing in the padded image on the basis of valid pixels detected in the process of tracing, started at a pixel in the preceding frame, in a sequence from the preceding frame to the present frame according to the forward motion vector, and the subsequent-frame rendering to restore a pixel at the start point of the tracing in the padded image on the basis of valid pixels detected in the process of tracing, started at an invalid pixel of the padded image in the present frame, in a sequence from the present frame to the subsequent frame according to the forward motion vector.

9 Claims, 17 Drawing Sheets

MOVING PICTURE CONVERTING APPARATUS AND METHOD, AND COMPUTER PROGRAM

CROSS REFERENCES TO RELATED APPLICATIONS

The present invention contains subject matter related to Japanese Patent Application JP 2005-171625 filed in the Japanese Patent Office on Jun. 10, 2005, the entire content of which is incorporated herein by reference.

BACKGROUND OF THE INVENTION

1. Field of the Invention

The present invention relates to a moving picture converting apparatus and method and a computer program. More particularly, it is directed to a moving picture converting apparatus and method and a computer program, capable of restoring quality image data from compressed data resulted from thinning pixels, for example, restoring a quality image with elimination of image deterioration such as jaggies (aliasing of spatial frequency) or the like conspicuous in slow-motion display of a restored image.

The present invention is generally related to a moving picture converting apparatus and method and a moving picture data format, and more particularly, to a moving picture converting apparatus and method and a moving picture data format, capable of appropriate reduction of the data amount of a moving picture.

2. Description of the Related Art

Since a moving picture has a very large amount of data, the data amount is normally to be reduced for storage or transmission.

The data amount of a moving picture can be reduced, for example, by reducing the resolution and frame rate of the whole picture on the basis of the velocity and brightness of the object (as in the Japanese Patent Laid-Out No. 2003-169284 (will be referred to as "Patent Document 1" hereunder)) or encoding a plurality of blocks of a moving picture with different image qualities, respectively (as in the Japanese Patent Laid-Open No. 2002-27466 (will be referred to as "Patent Document 2" hereunder).

SUMMARY OF THE INVENTION

However, the data compression method disclosed in the Patent Document 1 is disadvantageous in that since the moving picture is uniformly deteriorated irrespectively of the features of its blocks, some of the block features (such as magnitude of motion) will lead to reconstruction of a moving picture not easy to view.

Also the data compression method disclosed in the Patent Document 2 is applicable only to a moving picture captured with a fixed camera, and not to any picture captured with an ordinary hand-held camera. Blocks of a moving picture to be encoded with different qualities have to initially be selected manually. Since picture-block information is automatically corrected in correspondence to a variation of the moving picture, the range of applicability of this method is extremely limited.

It is therefore desirable to overcome the above-mentioned drawbacks of the related art by making it possible to reduce the data amount of a moving picture captured by one of various methods with minimization of the subjective deterioration of a moving picture reconstructed from the reduced amount of data.

According to the present invention, there are provided a moving picture converting apparatus and method and a computer program allowing a computer to carry out the moving picture converting method, in which compressed moving-picture data including a thinned image consisting of invalid pixels having values reduced and valid pixels keeping their values and a forward motion vector incident to the thinned image is inputted, invalid pixels in a present frame to be restored are interpolated based on the valid pixels of the thinned image in the present frame to produce a padded image, valid pixels detected in a frame preceding the present frame in the process of tracing, started at a pixel in the preceding frame, in a sequence from the present frame to the preceding frame according to the forward motion vector are used to restore pixels at an end point of the tracing in the padded image, and valid pixels detected in a frame subsequent to the present frame in the process of tracing, started at an invalid pixel of the padded image in the present frame, in a sequence from the present frame to the subsequent frame according to the forward motion vector are used to restore a pixel at the trace start point in the padded image.

According to the present invention, there is also provided a moving picture converting apparatus, in which compressed moving-picture data including a thinned image consisting of invalid pixels having values reduced and valid pixels keeping their values and a bidirectional motion vector incident to the thinned image is inputted, invalid pixels in a present frame to be restored are interpolated based on the valid pixels of the thinned image in the present frame to produce a padded image, valid pixels detected in a frame preceding the present frame in the process of tracing, started at a pixel in the preceding frame, in a sequence from the present frame to the preceding frame according to a backward motion vector included in the bidirectional motion vector are used to restore a pixel at an end point of the tracing in the padded image, and valid pixels detected in a frame subsequent to the present frame in the process of tracing, started at an invalid pixel of the padded image in the present frame, in a sequence from the present frame to the subsequent frame according to a forward motion vector included in the bidirectional motion vector are used to restore a pixel at the start point of the tracing in the padded image.

Note that the computer program according to the present invention can be provided to a general-purpose computer system capable of executing various program codes, for example, via a storage medium which can provide data in a computer-readable form, such as a CD (compact disk), FD (floppy disk), MO (magneto-optical disk) or the like, or via a communication medium such as a network. Supplied with the program in the computer-readable form, the computer system can make operations corresponding to a computer program included in the computer program.

Since in the moving picture converting apparatus and method and a computer program allowing a computer to carry out the moving picture converting method, according to the present invention, a backward rendering to trace valid pixels in a frame other than a present frame to be restored starting at a pixel in the present frame is used in combination with a forward rendering to trace pixels in the present frame starting at a valid pixel in the frame other than the present frame, so a moving picture can efficiently be reconstructed according to a unidirectional motion vector such as forward motion vector.

Also, since in the moving picture converting apparatus and method and a computer program allowing a computer to carry out the moving picture converting method, according to the present invention, there are generated a preceding-frame correspondence-points table including information on valid pixels in a frame preceding a present frame, corresponding to pixels in the present frame, and a subsequent-frame correspondence-points table including information on valid pixels in a frame subsequent to the present frame, corresponding to pixels in the present frame and the backward rendering and forward rendering are made with reference to the tables without development of the frames before and after the present frame, so the memory for developing the preceding and subsequent frames may be reduced in capacity and the time taken for access to the memory be reduced.

Since the moving picture converting apparatus according to the present invention is supplied with a bidirectional motion vector including the forward and backward motion vectors to make only the backward rendering with a pixel in the present frame to be restored being taken as a start point of tracing, so it can reconstruct a moving picture at a high speed while maintaining the quality and precision.

BRIEF DESCRIPTION OF THE DRAWINGS

FIG. 3 explains blocking operations of a block processor in the moving picture converter;

FIG. 5 also explains blocking operations of the block processor in the moving picture converter;

DETAILED DESCRIPTION OF THE PREFERRED EMBODIMENTS

The present invention will be described in detail concerning the moving picture converting apparatus and method and a computer program as embodiments thereof with reference to the accompanying drawings. It should be noted that the following will be described in sequence:

(1) Basic construction of the moving picture converter using the super-resolution effect
(2) Moving picture converting apparatus and method, for generating a quality restored image
(3) Moving picture converting apparatus and method according to the present invention
(1) Basic construction of the moving picture converter using the super-resolution effect First, the moving picture converting apparatus (will be referred to as "moving picture converter" hereunder) to compress a moving picture under the super-resolution effect as the base of the present invention. It should be noted that the basic construction is disclosed in detail in the description and drawings of the Japanese Patent Application 2003-412501 the Applicant of the present invention already filed in the Japanese Patent Office, in which a picture is divided into blocks and data amount of the picture is reduced by thinning pixels and frame rate adaptively to a moving velocity of each of the blocks.

Figure 1:
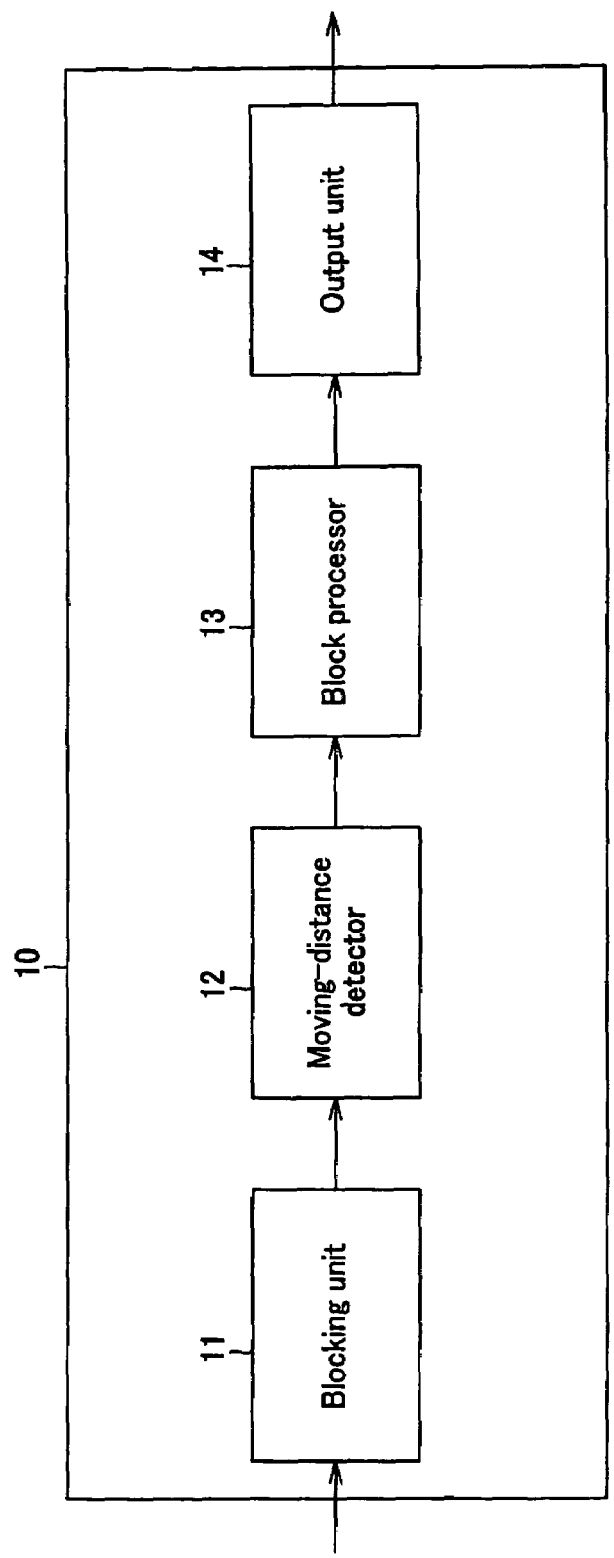
FIG. 1 is a schematic block diagram of the basic construction of a conventional moving picture converter to make data conversion under the super-resolution effect.

FIG. 1 illustrates an example of the construction of a conventional moving picture converter disclosed in the description and drawings of the Japanese Patent Application N. 2003-412501. The moving picture converter, generally indicated with a reference numeral 10, is designed to reduce the data amount of a moving picture to such an extent that the viewer cannot perceive any deterioration due to the reduction of data amount by making moving picture conversion under the super-resolution effect.

Note that the "super-resolution effect" is a visual effect under which the viewer can perceive a higher resolution than the number of displayed pixels when he or she looks after a moving object discretely sampled in the spatial direction. This is because the human being has such a visual characteristic that he will perceive an image having added thereto a plurality of images presented in a certain length of time. This human being's characteristic is ascribable to the time integration function included in the optical sensation, well known as "Bloch's law" as stated in "Visual Information Handbook", Japan Institute of Visual Sense, lines 219-220 and the like. It has been reported that the integrated length of time for which the Bloch's law is realized is about 25 to 100 ms depending upon the presenting conditions such as intensity of background light and the like.

The moving picture converter 10 shown in FIG. 1 makes moving picture conversion under the super-resolution effect raised by the time integration function to reduce or compress data to such an extent that the viewer will not perceive any image deterioration due to the data compression. The construction of the moving picture converter 10 will be explained below with reference to FIG. 1.

The moving picture converter 10 includes a blocking unit 11, moving-distance detector 12, block processor 13 and output unit 14. The blocking unit 11 divides each of frames of an input moving picture into blocks each including a predetermined pixel, and supplies the blocks to the moving-distance detector 12. The moving-distance detector 12 detects a moving distance of each of the blocks supplied from the blocking unit 1, and sends the block and its moving distance to the block processor 13. The block processor 13 makes moving-picture conversion, that is, compression, of the block supplied from the moving-distance detector 12 correspondingly to the moving distance of the block to reduce the data amount. The block processor 13 supplies the output unit 14 with the data of the compressed block supplied from the compression and having the data amount reduced. The output unit 14 outputs all the data of the block supplied from the block processor 13 and having the amount reduced together as a stream data.

Next, each of the above units will be explained in detail with reference to FIG. 2. First, the blocking unit 11 will be explained. As shown, it includes an image storage unit 21 and blocking unit 22. The image storage section 21 is supplied with frames of a moving picture supplied to the moving picture converter 10. The image storage section 21 stores the supplied frames. Each time the frames having been stored count N (positive integer), the image storage section 21 supplies the N frames to the blocking section 22, and the M-th one of the N frames (will be referred to as "M-th frame" hereunder) to the moving-distance detector 12 (moving-distance detecting section 31). It is assumed herein that the number N is four (N=4).

The blocking section 22 divides each of the N successive frames supplied from the image storage section 21 into blocks each having a certain size (8×8 or 16×16, for example) and supplies the blocks to the moving-distance detecting section 12 (block distributing section 32). Also, the blocking section 22 supplies each of blocks of the P-th one of the N frames stored in the image storage section 21 (will be referred to as "P-th frame" hereunder) to the moving-distance detector 12 (moving-distance detecting section 31). The P-th frame is different from the M-th frame.

Next, the moving-distance detector 12 will be explained. As shown, it includes a moving-distance detecting section 31 and block distributing section 32. The moving-distance detecting section 31 of the moving-distance detector 12 detects the motion vector of each block of the P-th frame supplied from the blocking section 22 of the blocking unit 11 by making block matching, for example, between the blocks with reference to the M-th frame supplied from the image storage section 21, and supplies the detected motion vector to the block distributing section 32. The motion vector represents moving distances in the horizontal (X-axial) and vertical (Y-axial) directions between the frames. It should be noted that the moving-distance detecting section 31 may be designed to enlarge the image for an improved accuracy of the moving-distance detection, to thereby make the moving-distance detection with the enlarged image.

The block distributing section 32 of the moving-distance detector 12 is supplied with N blocks (a total of N blocks taking corresponding positions in N frames) from the blocking section 22, and with a moving distance of one of the N blocks in the P-th frame from the moving-distance detecting section 31. The block distributing section 32 supplies the supplied N blocks and moving distances to any one of block processing sections 51 to 53 included in the block processor 13 to make operations corresponding to the moving distances, respectively.

More particularly, in case the horizontal (X-axial) or vertical (Y-axial) moving distance in one frame, supplied from the moving-distance detecting section 31, is more than two pixels, the block distributing section 32 outputs the N blocks supplied from the blocking sections 22 and moving distance supplied from the moving-distance detecting section 31 to the block processing section 51. Also, in case the horizontal or vertical moving distance in one frame is less than two pixels and more than one pixel, the block distributing section 32 outputs the N blocks and moving distance to the block processing section 53. In case the moving distance is other than the above, the block distributing section 32 will supply the N blocks and moving distance to the block processing section 52.

That is, the block distributing section 32 determines an optimum frame rate and spatial resolution on the basis of the moving distance supplied from the moving-distance detecting section 21, and distributes block images to the block processing sections 51 and 53 that will convert the image data according to the frame rate and spatial resolution.

Next, the block processor 13 will be explained in detail. The block processor 13 includes the three block processing sections 51 and 53 as mentioned above. The block processing section 51 makes space-directional thinning of pixels in the total of N blocks (whose horizontal or vertical moving distance is more than two pixels) supplied from the block distributing section 32 of the moving-distance detector 12 and taking corresponding positions in the N (N=4, for example) successive frames correspondingly to the moving distance also supplied from the block distributing section 32.

Figures 3A, 3B, 3C:
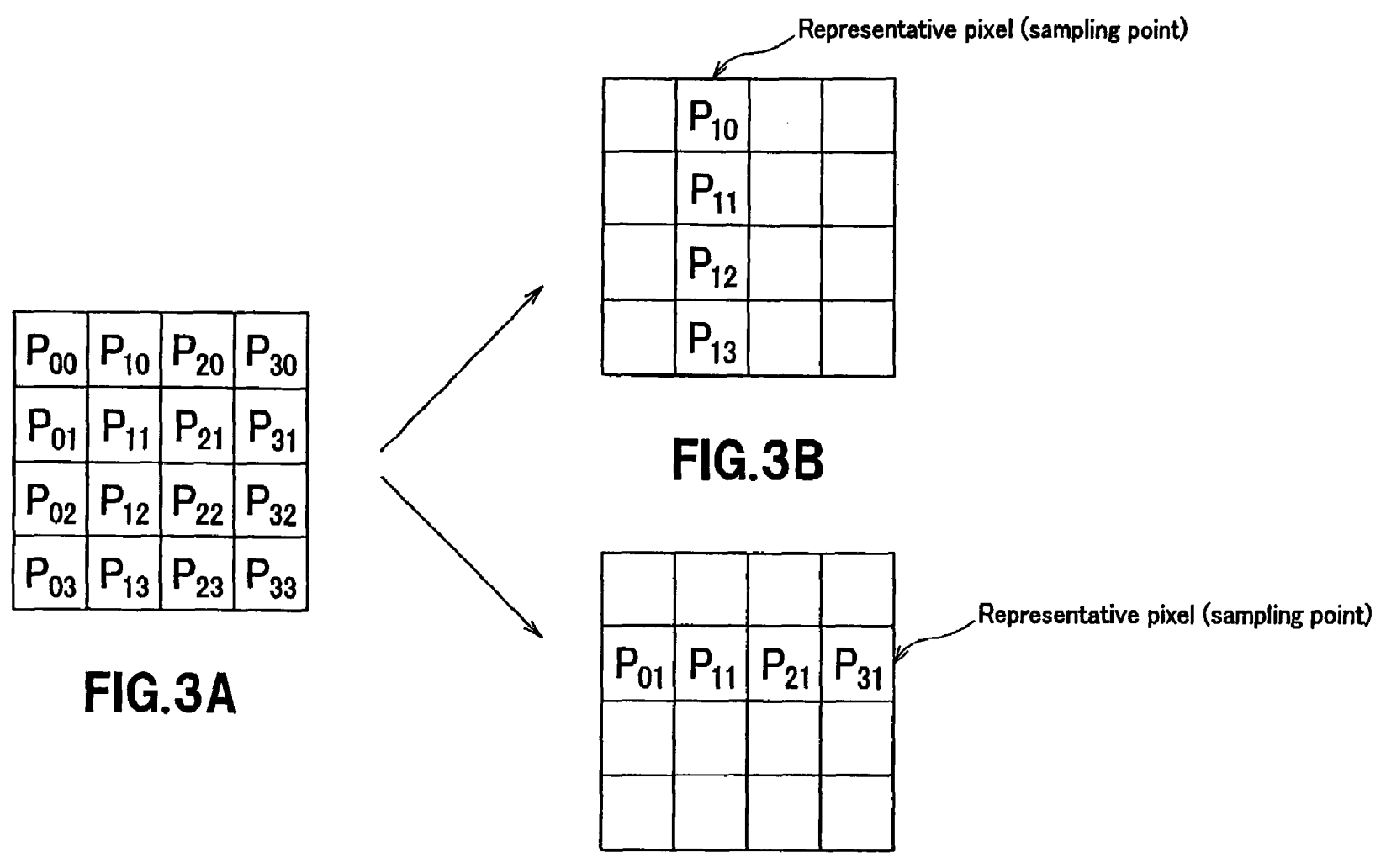

More specifically, in case the horizontal moving distance in one frame is more than two pixels, the block processing section 51 will select only one of the horizontal four pixels and validate it as a representative value when a block to be processed includes of 4×4 pixels as shown in FIG. 3A. In an example shown in FIG. 3B, only P10 of four pixels P00 to P30 is validated as a representative value (sampling point). The other pixel values are invalidated. Similarly, P11 of four pixels P01 to P31 is validated as a representative value (sampling point), P12 of four pixels P02 to P32 is validated as a representative value (sampling point), and P13 of four pixels P03 to P33 is validated as a representative value (sampling point).

When the vertical moving distance in one frame is more than two pixels, the block processing section 51 will select one of the vertical four pixels and validate it as a representative value in case a block is of 4×4 pixels as shown in FIG. 3A. In an example shown in FIG. 3C, only P01 of four pixels P01 to P03 is validated as a sampling point. The other pixel values are invalidated. Similarly, P11 of four pixels P10 to P13 is validated as a sampling point, P21 of four pixels P20 to P23 is validated as a sampling point, and P31 of four pixels P30 to P33 is validated as a sampling point.

Since the block processing section 51 makes the above space-directional thinning of each of the total of N (N=4) blocks taking corresponding positions in the supplied N (N=4, for example) successive frames, the data amount of each block is reduced to a quarter and thus the data amount of all the four blocks is reduced to a quarter. The block processing section 51 supplies data on the four blocks whose data amount has been reduced to the quarter to the output unit 14.

The block processing section 52 shown in FIG. 2 operates as will be described below. The block processing section 52 makes time-directional thinning of the total of N blocks (whose horizontal and vertical moving distances are both less than one pixel) supplied from the block distributing section 32 of the moving-distance detector 12 and taking corresponding positions in the N (N=4, for example) successive frames.

Figure 4:
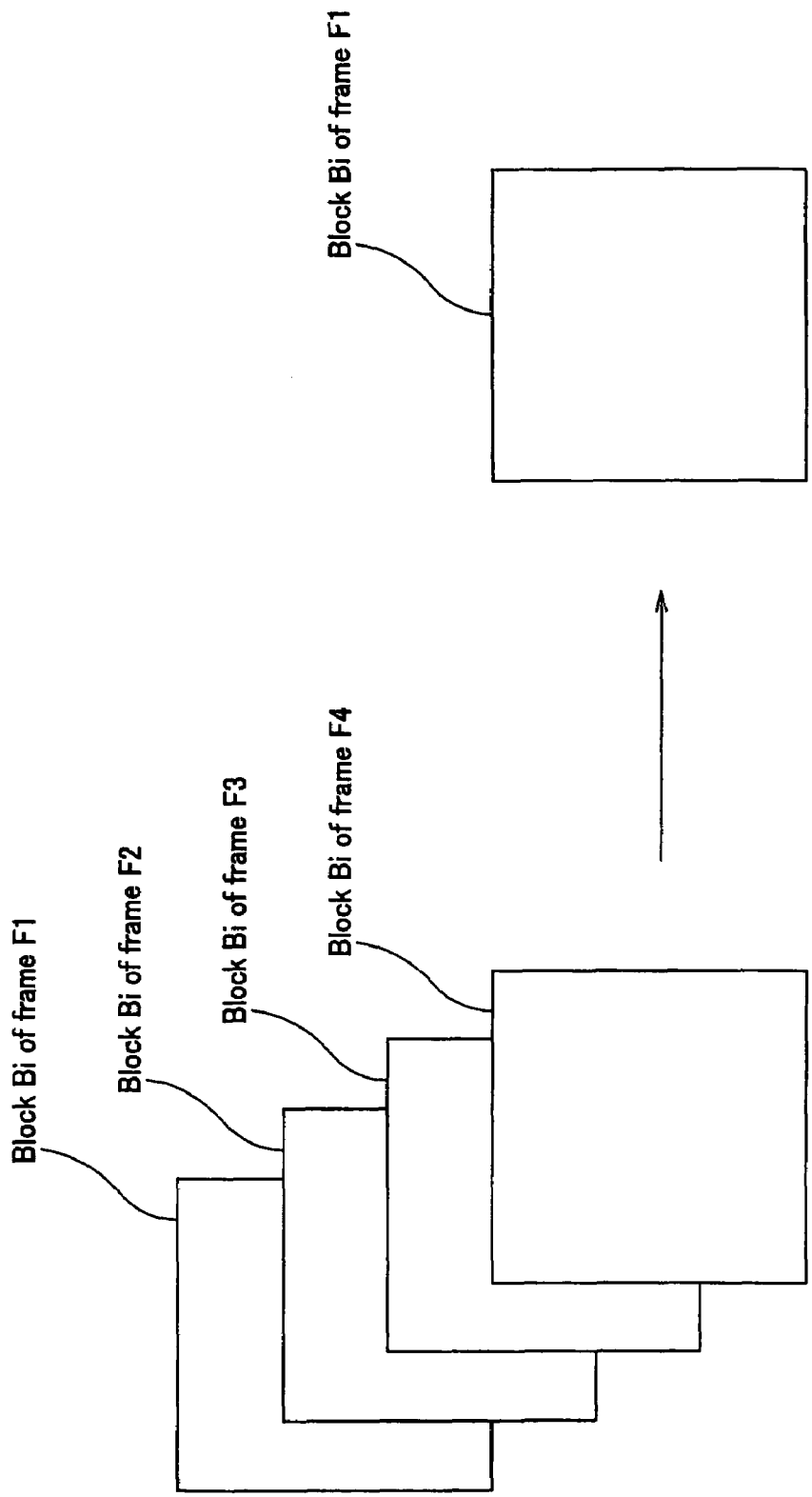
FIG. 4 also explains blocking operations of the block processor in the moving picture converter.

More specifically, the block processing section 52 makes frame thinning of four successive frames F1 to F4 to select only one (Bi in the frame F1, in this case) of four blocks Bi taking corresponding positions in the four frames F1 to F4 as shown in FIG. 4. The block processing section 52 supplies data in the four blocks whose data amount has been reduced to a quarter (data in one block), resulted from the time-directional thinning, to the output unit 14. Thus, the pixel data for the selected one block is taken as sampling-point data corresponding to the four frames.

The block processing section 53 makes the pixel thinning (space-directional thinning) and frame thinning (time-directional thinning) of the total of N blocks (N blocks whose horizontal and vertical moving distances are both more than one pixel and less than two pixels) supplied from the block distributing section 32 of the moving-distance detector 12 and taking corresponding positions in the N successive frames.

Figures 5A, 5B, 5C:
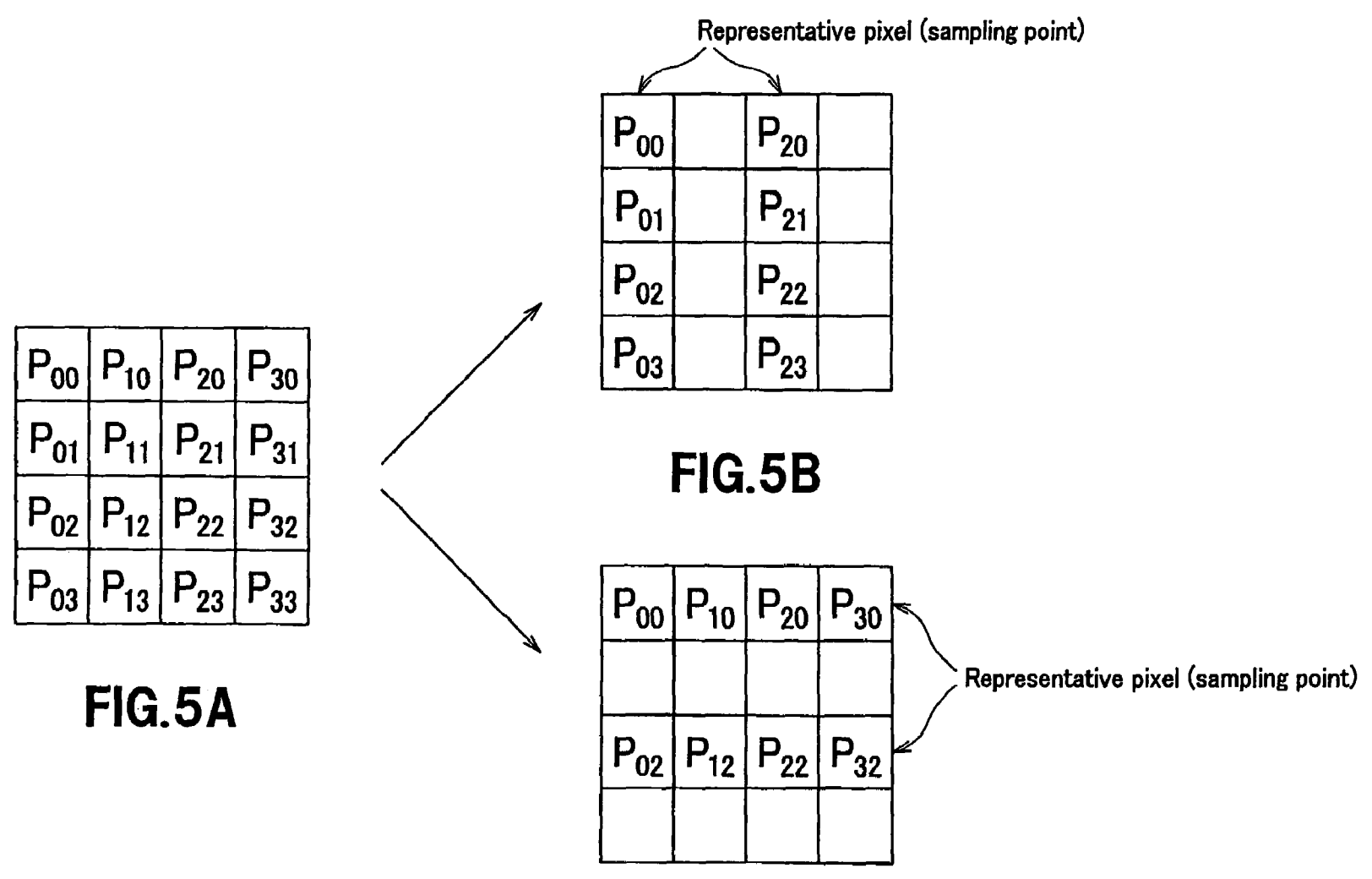

The block processing section 53 makes a different thinning operation from that the block processing section 51 does. That is, when the horizontal moving distance in one frame is more than one pixel and less than 2 pixels as shown in FIG. 5, the block processing section 53 selects only two of four horizontal pixels and takes them as representative values in case a block to be processed is of 4×4 pixels as shown in FIG. 5A. In an example shown in FIG. 5B, only P00 and P20 of four pixels P00 to P30 are validated as the representative values (sampling points). The other pixel values are invalidated. Similarly, only P01 and P21 of four pixels P01 to P31 are taken as representative values (sampling points), only P02 and P22 of four pixels P02 to P32 are taken as representative values (sampling points) and only P03 and P23 of four pixels P03 to P33 are taken as representative values (sampling points).

When the vertical moving distance in one frame is more than one pixel and less than two pixels, the block processing section 53 will select two of vertical four pixels as representative values (sampling points) in case the block to be processed is of 4×4 pixels as shown in FIG. 5A with discarding the other pixels. In the example shown in FIG. 5C, pixels P00 and P02 of four pixels P00 to P03 are validated as representative values (sampling points) and others are invalidated. Similarly, P10 and P12 of four pixels P10 to P13 are taken as representative values (sampling points), P20 and P22 of four pixels P20 to P23 are taken as representative values (sampling points) and P30 and P32 of four pixels P30 to P33 are taken as representative values (sampling points).

Figure 6:
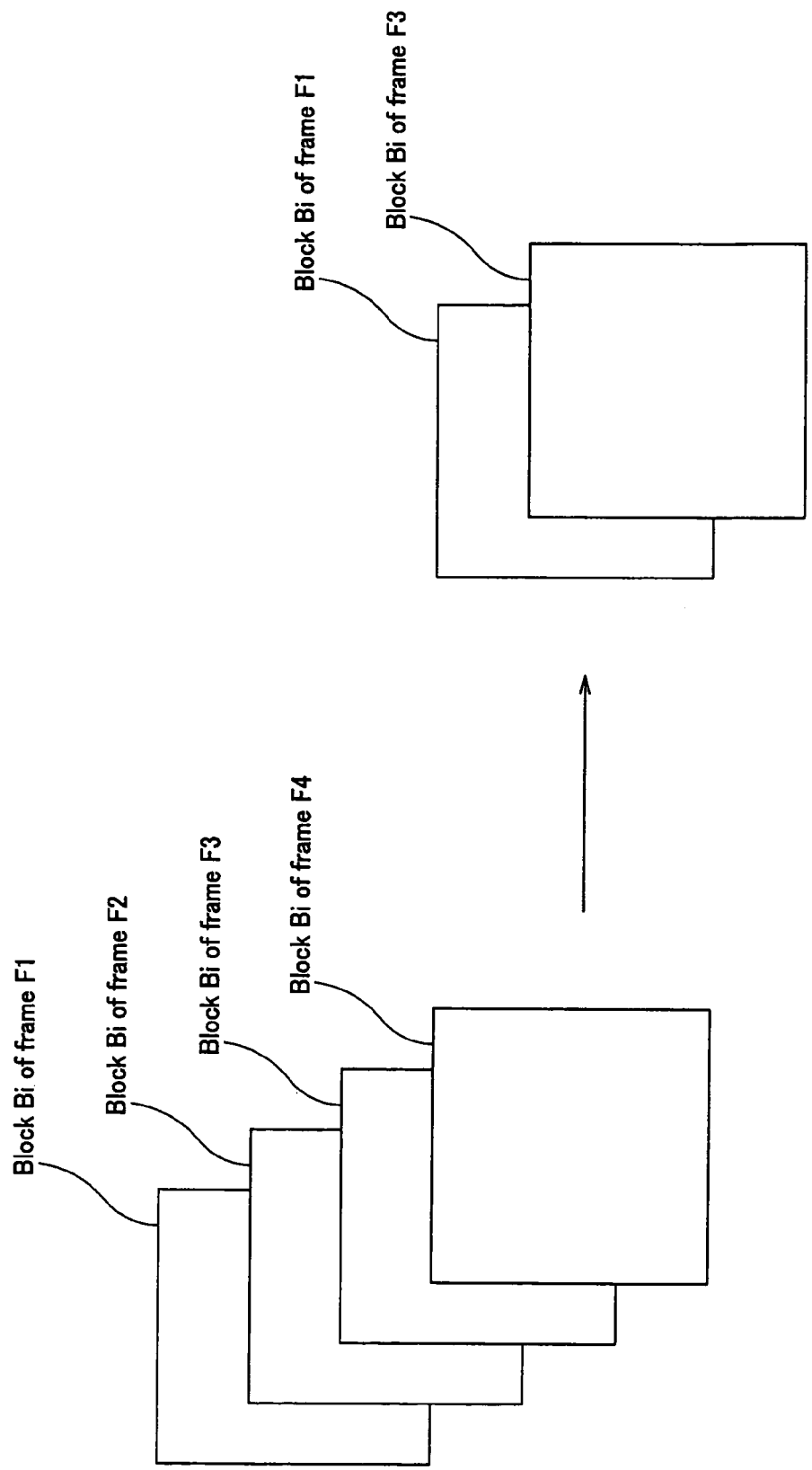
FIG. 6 also explains blocking operations of the block processor in the moving picture converter.

Further, the block processing section 53 thins frames. More particularly, the block processing section 53 thins frames by selecting two of four blocks in corresponding positions in four successive frames F1 to F4. The frame thinning operation by the block processing section 53 is different from the thinning operation by the block processing section 52. Namely, the block processing section thins frames (between two frames) by selecting any two of a total of four blocks Bi taking corresponding positions in the four successive frames F1 to F4 (two blocks in the frames F1 and F3) as shown in FIG. 6. Pixel data in the selected two blocks are sampling-point data corresponding to the four frames. In this case, the eight sampling points have already been selected in one block in the space-directional thinning having been described above with reference to FIG. 5. A total of 16 sampling points is selected from two blocks, and they will be set as sampling-point data corresponding to the four frames.

The block processing section 53 subjects the supplied four blocks to both the space-directional thinning to reduce the data amount to a half as having been described above with reference to FIG. 5 an the time-directional thinning to reduce the data amount to a half as having been described above with reference to FIG. 6. As the result, the data amount of the four blocks is reduced to a quarter (¼=(½×½)). Thus, the block processing section 53 supplies data in the four blocks whose data amount has been reduced to a quarter to the output unit 14.

The output unit 14 generates stream data from the data on the N blocks supplied from each of the block processing sections 51 to 53 of the block processor 13 and whose data amount has been reduced.

Figure 7:
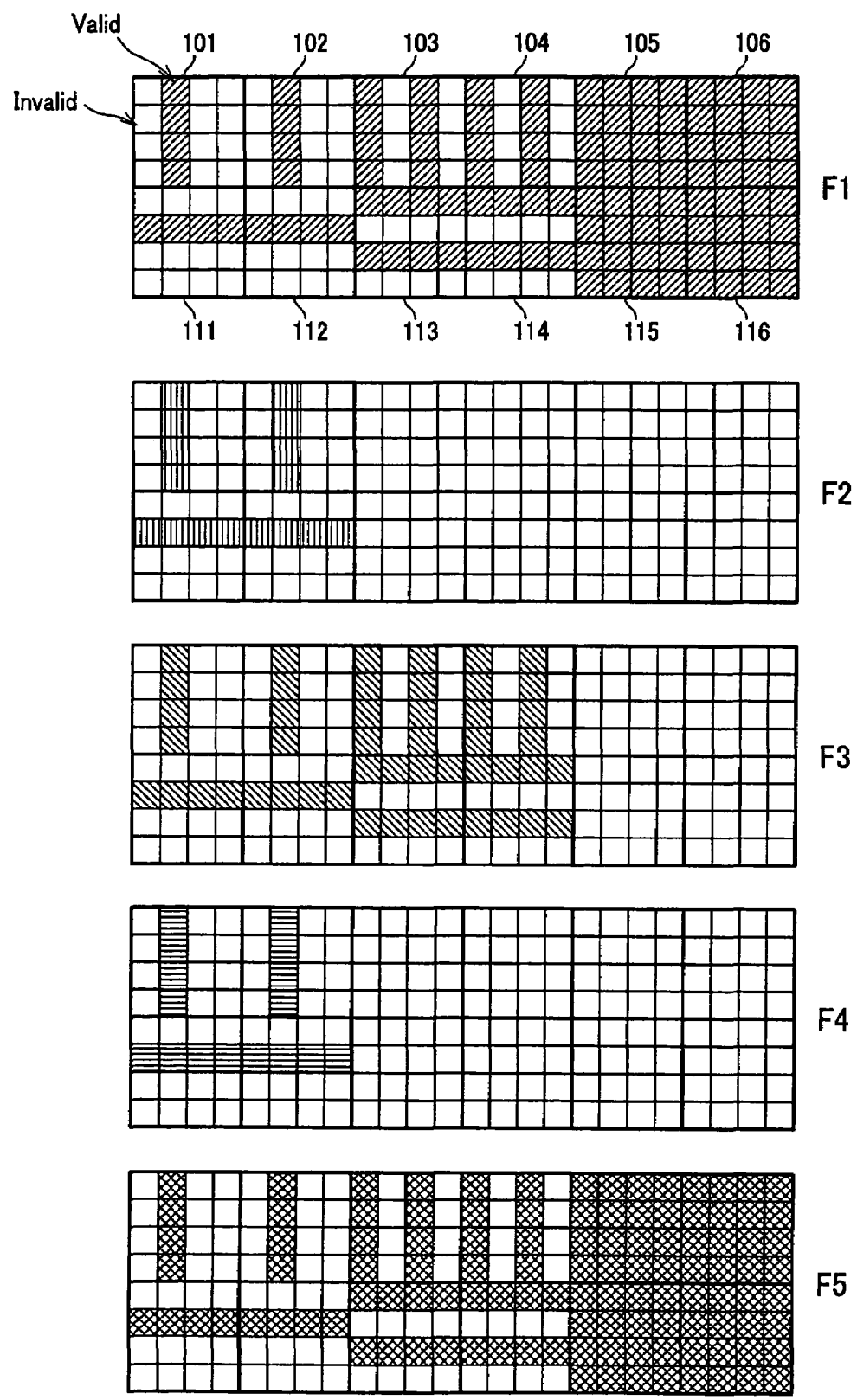
FIG. 7 explains an example of the results of block processing operations made by the block processor in the moving picture converter.

The moving picture converter 10 operates as will be described below with reference to FIG. 7. FIG. 7 shows five successive frames F1 to F5 processed by the moving picture converter 10 and positions of valid data selected from each frame. In FIG. 7, other than blanks indicate the valid pixels selected in the moving picture converter 10 and the blanks indicate the invalid pixels not selected.

The frames F1 and F5 are identical to each other and laid in a time sequence, and each of them includes blocks 101 to 116 each of 4×4 pixels.

The blocks 101 and 102 of the blocks 101 to 116 are thinned by the block processing section 51 horizontally in the spatial direction. The blocks 111 and 112 are thinned by the block processing section 51 vertically in the spatial direction. The blocks 103 and 104 are thinned by the block processing section 53 horizontally in both the spatial and temporal directions. The blocks 113 and 114 are thinned by the block processing section 53 in both the spatial and temporal directions. The blocks 105, 106, 115 and 116 are thinned by the block processing section 52 in the temporal direction.

Of the first frame F1, each of the blocks 101 and 102 is horizontally thinned by the block processing section 51 to a quarter (four valid pixels) of the initial data amount. Each of the blocks 111 and 112 is vertically thinned by the block processing section 51 to a quarter (four valid pixels) of the initial data amount. Each of the blocks 103 and 104 is horizontally thinned by the block processing section 53 to a half (eight valid pixels) of the initial data amount. Each of the blocks 113 and 114 is vertically thinned by the block processing section 53 to a half (eight valid pixels) of the initial data amount. Each of the blocks 105, 106, 115 and 116 is thinned in the temporal direction by the block processing section 52 to a quarter (four valid pixels) of the initial data amount.

Of the second frame F2, each of the blocks 101 and 102 and blocks 111 and 112 is thinned similarly to the frame F1 to a quarter (four valid pixels) of the initial data amount. Each of the blocks 103 and 104 and blocks 113 and 114 is thinned by the block processing section 53 in the temporal direction for all their pixels to be invalid. Each of the blocks 105, 106, 115 and 116 is thinned by the block processing section 52 in the temporal direction for all their pixels to be invalid.

Of the third frame F3, each of the blocks 101 and 102 and blocks 111 and 112 is thinned similarly to the frame F1 to a quarter (four valid pixels) of the initial data amount. Each of the blocks 103 and 104 and blocks 113 and 114 forms a valid frame, and thinned similarly to the frame F1 to a half (eight valid pixels) of the initial data amount. Each of the blocks 105, 106, 115 and 116 is thinned by the block processing section 52 in the temporal direction for all their pixels to be invalid.

Of the fourth frame F4, each of the blocks 101 and 102 and blocks 111 and 112 is thinned similarly to the frame F1 to a quarter (four valid pixels) of the initial data amount. Each of the blocks 103 and 104 and blocks 113 and 114 is thinned by the block processing section 53 in the temporal direction for all their pixels to be invalid. Each of the blocks 105, 106, 115 and 116 is thinned by the block processing section 52 in the temporal direction for all their pixels to be invalid.

Since it is assumed herein that N=4, the fifth frame F5 is thinned similarly to the first frame F1. Thus, data in each of the blocks is optimally thinned correspondingly to moving-velocity information, and is finally reduced to a quarter of the initial data amount.

As having been explained above, the moving picture converter 10 shown in FIG. 1 is to convert an input moving picture into a moving picture having the data amount thereof reduced (compressed data). At this time, the moving picture conversion is made using the super-resolution effect which can be implemented on the basis of the predetermined visual characteristic, so that the viewer will not be aware of any image deterioration due to the reduction of the data amount.

More specifically, the block distributing section 32 determines an optimum frame rate and spatial resolution on the basis of a moving distance supplied from the moving-distance detecting section 21 and supplies them to the block processing sections 51 to 53 which will convert image data according to the optimum frame rate and spatial resolution, and the block processing sections 51 to 53 convert the image data in different manners, respectively, to thereby implement such a moving picture conversion that the viewer will not be aware of any image deterioration. It should be noted that the "super-resolution effect" is a visual effect under which the viewer will perceive a higher resolution than the number of displayed pixels when he or she looks after a moving object discretely sampled in the spatial direction as having previously been mentioned. This is ascribable to the human being's characteristic based on the time integration function included in the faculty of sight. The moving picture converter 10 shown in FIG. 1 makes moving picture conversion using the super-resolution effect based on the time integration function.

Note that the human being's visual character and super-resolution effect are described in detail in the description and drawings of the Japanese Patent Application No. 2003-412501. The conditions under which the super-resolution effect explained in the description and drawings of this patent application will be outlined below.

When pixels are thinned by a data amount (in pixels) $\underline{m}$, the super-resolution effect will take place under the condition that all the first- to (m−1)th-order aliasing components caused by the thinning are canceled. For the k(=1, 2, . . . , m−1)th-order aliasing component to be canceled, the following equations (1) and (2) should be met:

$$\sum_{t} \cos(2\pi k \Phi_1) = 0 \quad (1)$$

$$\sum_{t} \sin(2\pi k \Phi_1) = 0 \quad (2)$$

where $\phi 1$ is a deviation of the sampling position in thinning the pixels, which is defined by a time $\underline{t}$ (=0, 1 T, 2T, . . . ), velocity $\underline{v}$ of a signal and a time interval T (reciprocal of a frame rate) on the basis of the following equation (3):

$$\Phi_1 = -\frac{v}{m}\frac{t}{T} \quad (3)$$

The super-resolution effect will take place when the equations (1) to (3) including the amount of thinning (in pixels) $\underline{m}$ and moving distance $\underline{v}$ in a small block, and thus an image deterioration will not be easy to perceive by the viewer.

In case an image is displayed at the same frame rate as that of an input moving picture, a block thinned in the spatial distance and images in a preceding and next frames are added together by the time integration function of the human being's sense of sight with the result that an image equivalent to an original image can be perceived by the viewer.

However, in case an image is displayed at a frame rate slower than that of an input moving picture (slow-motion display) or in case it is continuously displayed at the same frame rate for a certain length of time (pausing), a block thinned in the spatial direction and images in a preceding and next frames will not be added together with the result that jaggies (aliasing of spatial frequency) caused by the reduction of data amount will be perceived by the viewer.

To solve the above problem, there has been proposed a method of interpolating a compressed image thinned space-directionally by a linear or nonlinear filter. By this method, however, the high-frequency component included in a moving picture cannot be restored and the moving picture will result in an indistinct image (due to deterioration of spatial frequency). There will be explained an approach made to solve the above problem by making it possible to display a moving picture equivalent to an original one even in case a moving picture is to be displayed at a lower frame rate than that of an input moving picture (slow-motion display).

(2) Moving picture converter and moving picture converting method, for reconstructing a quality moving picture As having been described above, when a spatial thinning-compressed image is restored, it will be deteriorated remarkably as the case may be. Especially in a slow-motion display in which an image is displayed at a lower frame rate than that of an input moving picture, jaggies (aliasing of spatial frequency) due to the reduction of data amount will be perceived by the viewer. A solution to this problem will be explained herebelow.

Figure 8:
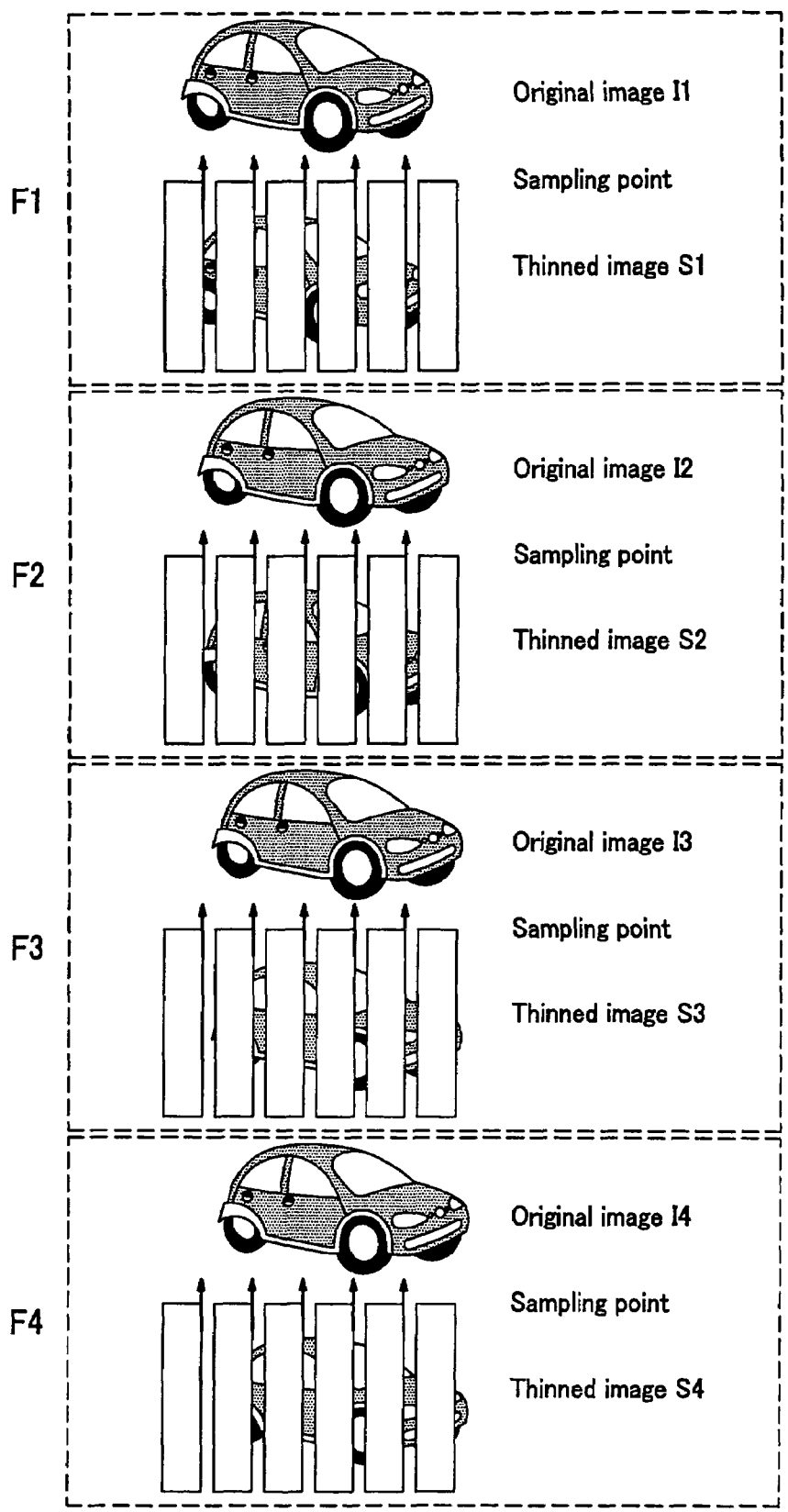
FIG. 8 explains an example of horizontal spatial thinning of a moving object and an example of restoration of an original picture.

First, the theory of restoring an original moving picture from a moving picture of which some information is missing due to the space-directional quarter thinning will be explained. FIG. 8 shows images S1 to S4 resulted from horizontal spatial thinning of original images I1 to I4 captured by imaging an object (car) moving to the right. In a frame F1, the original image I1 is an image captured by imaging an object moving to the right.

Figure 2:
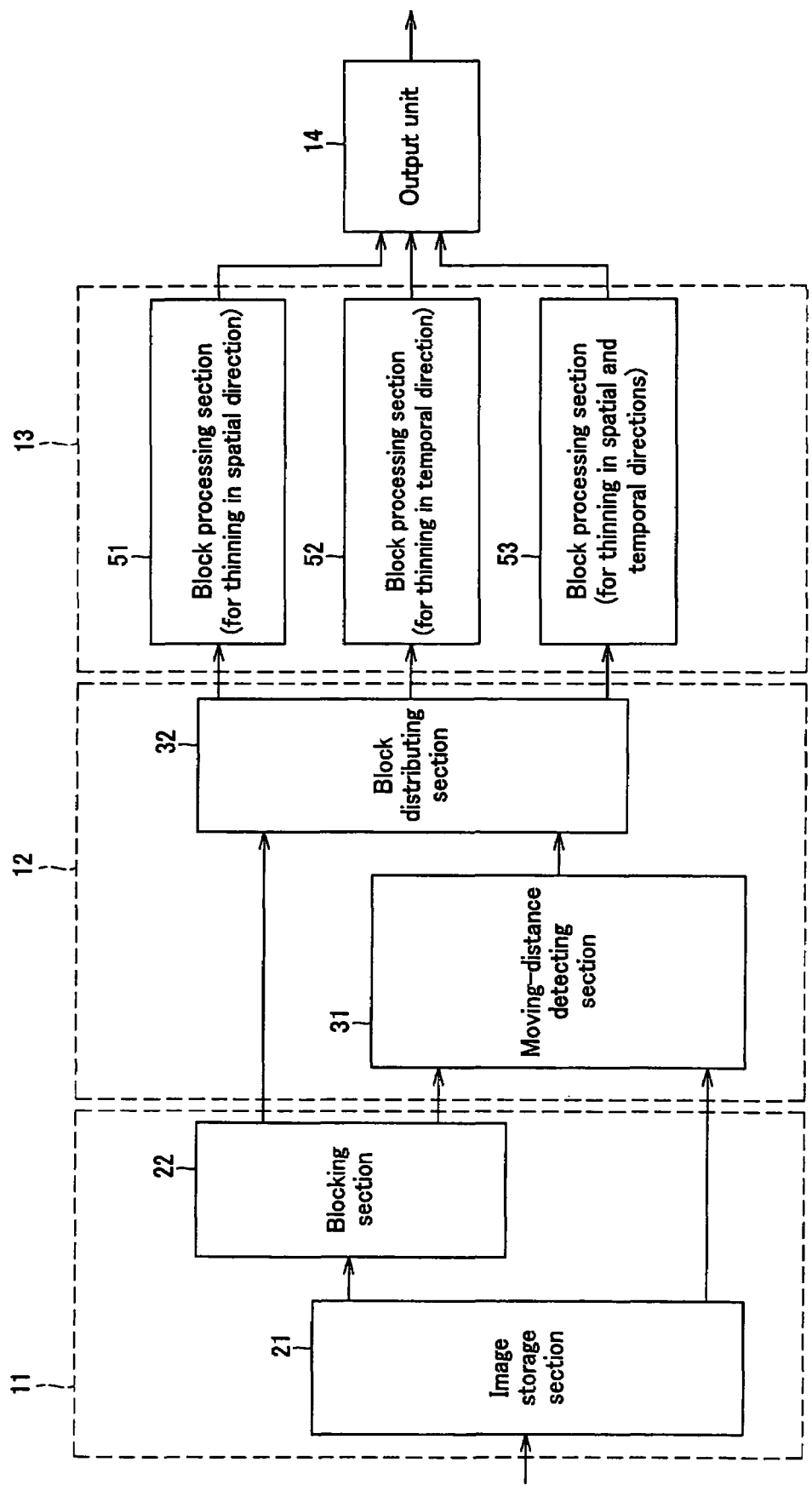
FIG. 2 is also a schematic block diagram of the basic construction of the moving picture converter in which data conversion is made under the super-resolution effect.

In case the velocity of the object (car) is distributed from the block distributing section 32 of the moving picture converter shown in FIG. 2 to the block processing section 51 (for the space-directional thinning), that is, when the moving amount per frame is coincident with a predetermined condition, the space-directional thinning is made in the block processing section 51. As the result, the original image I1 is thinned horizontally to a quarter of the initial data amount at sampling points indicated with arrows in FIG. 8. Positions of the sampling points in the thinning (representative pixels (sampling points) in FIG. 3) are fixed in relation to the frame. The thinned image S1 has a data amount reduced to a quarter of that of the original image I1.

In a frame F2, the original image I2 represents the object moved the velocity $\underline{v}$ (pixels/frame) to the right in relation to the original image I1. In this state, the frame F2 is thinned similarly to the frame F1 to provide a thinned image S2. In this case, since the sampling points are in the same positions as in the frame F1, the thinned image S2 is different from the thinned image S1.

Similarly, in frames F3 and F4, original images I3 and I4 are thinned to provide thinned images S3 and S4. In this example, v=1 (pixels/frame) and the super-resolution effect takes place in the quarter thinning during normal display.

The thinned images S1 to S4 are the images thinned at the sample sampling points. Unless the moving velocity $\underline{v}$ of the object is an integral multiple of the thinned data amount (4 in this embodiment), the thinned images S1 to S4 are images sampled in different positions, respectively. Therefore, the thinned images S1 to S4 miss some information of their respective original images, respectively, and thus include information different from each other. The original moving picture can be restored by adding these images together while aligning them with each other on the basis of the moving-velocity information.

Figure 9:
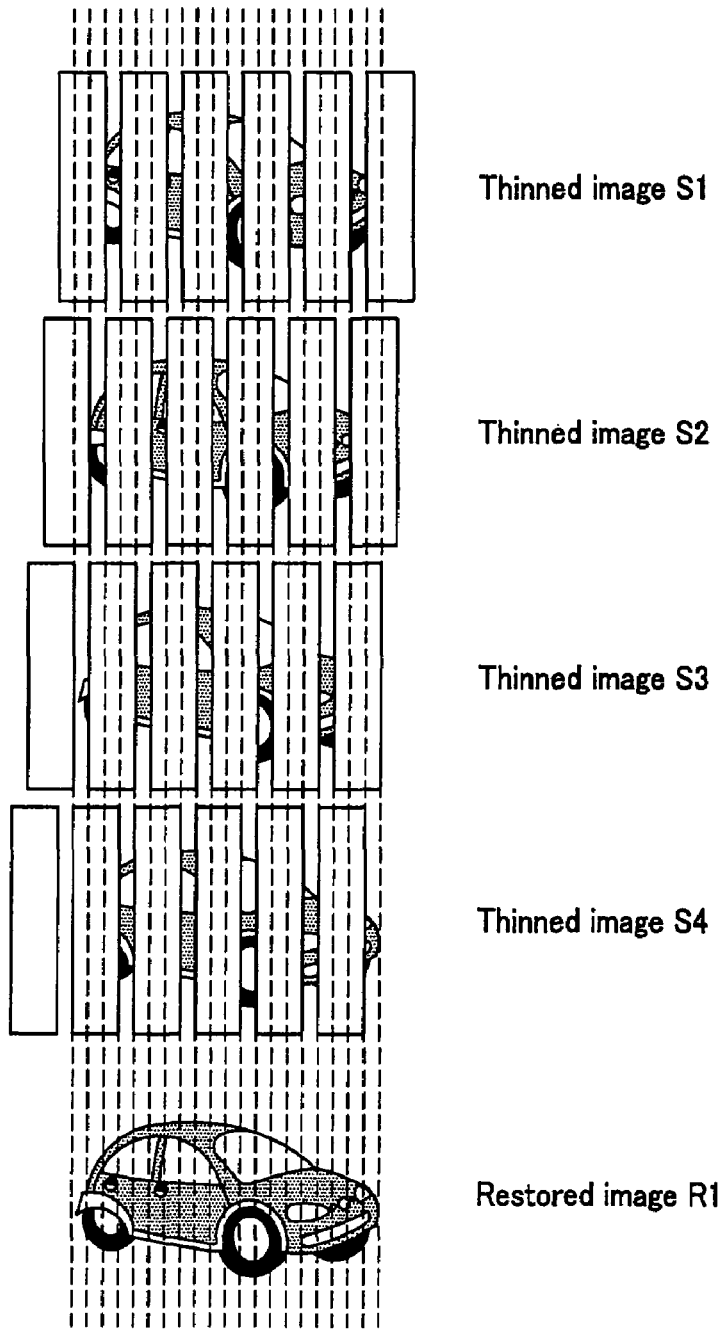
FIG. 9 explains an example of changing, per frame, the thinning position in the horizontal spatial thinning of the moving object and the restoring operation.

FIG. 9 shows images resulted from moving the thinned images S1 to S4 corresponding to the frames F1 to F4, respectively, at the velocity $\underline{v}$. In the illustrated example, since v=1 (to the right), the thinned image S2 is shifted one pixel to the left from the position of the thinned image S1, the thinned image S3 is shifted two pixels to the left from the position of the thinned image S2 and the thinned image S4 is shifted three pixels to the left from the position of the thinned image S3, as will be seen in FIG. 9. As the result, the thinned images S1 to S4 are coincident in position with each other in the original moving picture and different in sampling position from each other. By combining these thinned images together, a restored image R1 can be obtained.

In this example, since the moving velocity v=1 and the image is thinned horizontally to a quarter of the initial data amount, the original moving picture can completely be restored by adding the images of the four frames together. For complete restoration of the original moving picture, the following conditions should be met:

Condition 1: Shape and color of the object should not vary over all the frames to be integrated together.

Condition 2: The moving velocity of the object should be a known one.

In addition to the above conditions 1 and 2, a condition 3 that aliasing of the spatial frequency caused by the thinning, which depends upon the relation among a moving velocity $\underline{v}$, thinned data amount and number of integrated frames, should be able to completely be canceled by the integration should be met. For occurrence of the super-resolution effect in case pixels have been thinned by a thinned data amount $\underline{m}$ (in pixels), all the first- to (m−1)th-order aliasing component have to be canceled. To cancel the k(=1, 2, ..., m−1)th-order aliasing component, the above-mentioned equations (1) and (2) should be met.

Actually, however, it is very difficult for the input moving picture to meet all the above conditions. Especially, to set conditions under which the aliasing components are completely canceled, the simultaneous equations should be solved. Even on the assumption that the aliasing component canceling conditions are determined, the number of integrated frames is limited in practice.

The moving picture converter according to the present invention is capable of restoring quality data irrespectively of whether the above conditions are met or not. It provides image restoration with a circuit of a practical scale, and implements successful image production by interpolating image parts which cannot have been restored.

Figure 10:
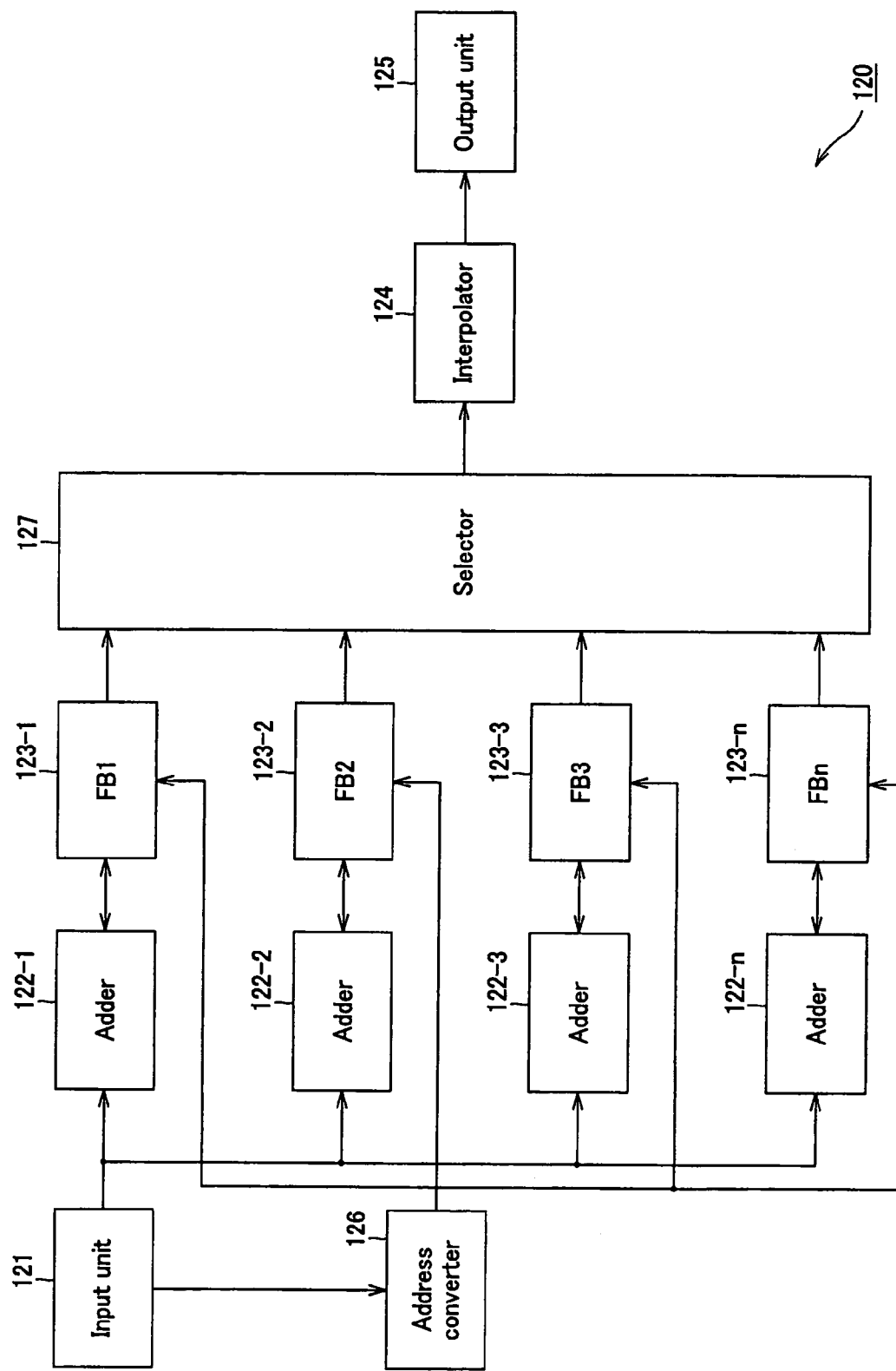
FIG. 10 is a schematic block diagram of a moving picture converter using the conventional super-resolution effect.

There will be explained the moving picture converter according to the present invention, that is, an apparatus to restore a moving picture from compressed image data resulted from the pixel thinning, more particularly, an apparatus capable of restoring a quality moving picture even in a slow-motion display in which an image is displayed at a frame rate slower than that of the input moving picture, for example, by reducing jaggies (aliasing of the spatial frequency) due to data reduction. FIG. 10 shows the construction of a moving picture converter 120 using a conventional technique for the super-resolution effect.

As shown, the moving picture converter 120 has an input unit 121 that is supplied with a data stream including compressed data generated by the moving picture converter 10 shown in FIG. 1, for example. The input unit 121 supplies converted image data corresponding to blocks as compressed data included in the input data stream to adders 122-1 to 122-n. The compressed data includes sampling-point data selected through the space- or time-directional thinning. Also, the input unit 121 supplies an address converter 126 with attribute data (thinning method, thinning direction, etc.) and motion vector data in the blocks included in the data stream. It should be noted that in case no motion vector data exists in the data stream generated by the moving picture converter 10, the input unit 121 or address converter 126 will detect a motion vector using image data included in the data stream to make an operation which uses a detected motion vector. In case the address converter 126 is to detect a motion vector, it is supplied with the compressed image data and detects a motion vector on the basis of the compressed image data.

The adders 122-1 to 122-n receive image data in a present frame including compressed data corresponding to a plurality of blocks supplied from the input unit 121, read data stored in frame buffers 1 to n (123-1 to 123-n) and averages the pixel values of image data in the present frame and data read from the buffers. The data stored in the frame buffers 1 to n (123-1 to 123-n) is an average of the pixel values of the image data in the present frame or pixel values of the sampling points in a plurality of frames. These operations will be described in detail later.

Each of the frame buffers 1 to n (123-1 to 123-n) provisionally stores past-frame image data being positioned in relation to each other, and has a number of pixels, two times larger than each of the length and width of an original image (not yet thinned). The number $\underline{n}$ of frame buffers corresponds to that of frames used for image restoration. In case the number $\underline{n}$ is small, many blocks cannot be restored. On the contrary, if the number $\underline{n}$ is larger, the number of blocks that cannot be restored is smaller but the error due to a variation of the moving velocity of the object and change of the shape. It is assumed that n=8, for example.

The address converter 126 receives the attribute data (thinning method, thinning direction, etc.) and motion vector data in blocks supplied from the input unit 121 and determine addresses for the frame buffers 123-1 to 123-n per block.

The moving picture converter 120 also includes a selector 127. The selector 127 selects any of the frame buffers FB1 to FBn (123-1 to 123-n) as an output buffer and supplies the data from the selected frame buffer to an interpolator 124 also included in the moving picture converter 120. At this time, the frame buffer is selected correspondingly to restored frames.

To restore a first frame (F1), the selector 127 will select the frame buffer FB1 (123-1) as an output buffer. At this time, the frame buffers FB2 (123-2) to FBn(123-n) correspond to (1+1) th frame (second frame) to (1+(n−1))th frame.

To restore the second frame (F2), the selector 127 will select the frame buffer FB2 (123-2) as an output buffer. At this time, the frame buffers FB3 (123-3) to FBn(123-n) are sequentially shifted to correspond to (2+1)th frame (third frame) to (2+(n−2))th frame. The frame buffer FB1 (123-1) will be set to correspond to (2+(n−1))th frame.

Similarly, to restore the third frame (F3), the selector 127 will select the frame buffer FB3 as an output buffer. To restore the fourth frame (F4), the selector 127 will select the frame buffer FB4 as an output buffer. To restore the fourth frame (F5), the selector 127 will select the frame buffer FB5 as an output buffer.

As above, the selector 127 cyclically selects any of the frame buffers FB1 to FBn (123-1 to 123-n) as an output buffer and outputs data from a selected frame buffer to the interpolator 124.

The correspondence between the frames supplied to, and restored by, the interpolator 124 and the frame data stored in the frame buffers FB1 to FBn at the time is shown in Table 1.

TABLE 1

| Frame to be processed | F1 | F2 | F3 | F4 | F5 | ... |
|---|---|---|---|---|---|---|
| Present frame (selected) | FB1 | FB2 | FB3 | FB4 | FB5 | ... |
| (1 + 1)th frame | FB2 | FB3 | FB4 | FB5 | FB6 | ... |
| (1 + 2)th frame | FB3 | FB4 | FB5 | FB6 | FB7 | ... |
| . | | | | | | |
| . | | | | | | |
| . | | | | | | |
| (1 + (n − 1))th frame | FBn | FB1 | FB2 | FB3 | FB4 | ... |

For example, in case the frame to be processed in the first frame (F1) as in Table 1, the present frame, that is, the interpolator 124 is supplied with data from the frame buffer FB1 (123-1), which means that data in the second to (n−1)th frames are stored in the frame buffers FB2 (123-2) to FBn (123-n). In case the frame to be processed is the second frame (F2), the present frame, that is, the interpolator 124 is supplied with data from the frame buffer FB2 (123-2), which means that the third and subsequent data are stored in the frame buffers FB3 (123-3) to FB1 (123-1).

As above, the selector 127 cyclically selects any of the frame buffers FB1 to FBn (123-1 to 123-n) as an output buffer and the interpolator 124 makes interpolation between the frames to restore the frame data.

Note that although in this example, the selector 127 is provided to cyclically select any of the frame buffers FB1 to FBn (123-1 to 123-n) as an output buffer and supplies the data from the selected frame buffer to the interpolator 124, only a certain one of the frame buffers FB1 to FBn (123-1 to 123-n) may be positioned as an output buffer by cyclically shifting the data stored in the frame buffers FB1 to FBn (123-1 to 123-n).

The interpolator 124 generates a restored block which is based on the sampling-point data in a plurality of difference frames on the basis of data written in a frame buffer selected by the selector 127. Further, it will interpolate pixels which could not be restored only from the sampling-point data (pixel missing) from surrounding pixels in a manner which will be described later. The interpolator 124 further converts image data having a size two times larger than the length and width of an original image stored in the frame buffer into data including the same number of pixels as those of the original image by compressing and supplies the converted image data to the output unit 125.

The output unit 125 converts the image data supplied from the interpolator 124 into an image signal form which can be accepted by the display unit and supplies the converted data to the latter. It should be noted that the moving picture converter 120 includes a controller (not shown) that controls the other components of the moving picture converter 120 according to a computer program in which, for example, a processing sequence is recorded.

In the aforementioned moving picture converter 120 as a conventional example of the present invention includes, the frame buffer provisionally used for interpolation has a capacity s×s times larger than the input image size. In the moving picture converter 120, s=2. However, when s=8 for example for the balance between image quality and processing, a memory capacity 8×8×4 (256) times larger than the input image size is required when the pixel precision for integration (bit width 4 times larger than input RGB) is taken in consideration. When this memory capacity is applied to a full HD (high definition: approx. 2,000,000 pixels), for example, the frame buffer should have a large capacity of about 1.5 gigabytes (GB).

Further, for write, and addition, of pixel values based on the motion vector, access is made to a random memory. Random access to a large-capacity buffer memory will lower the processing speed. Further, at the stage after the time interpolation, all pixels in the frame buffer have to sequentially be scanned for resolution conversion. However, if the number of pixels is large, input and output of them will take long, which will lower the processing speed.

Also, in the aforementioned moving picture converter 120, valid pixel values of a past frame are written into the present frame to calculate the pixel values. However, valid pixel values of a future frame which the present frame will be may thus be written for the calculation of pixel values.

It is assumed here that of the n frame buffers in the moving picture converter 120 shown in FIG. 10, the number of frame buffers to store data for a past frame is b, the number of frame buffers to store data in a future frame is f and the number of frame buffers to store data for a frame being currently processed is 1, namely, n=b+f+1.

In this example of setting, the address converter 126 adds together motion vectors corresponding to a block to be processed to determine addresses of valid pixels for the future frame while tracing the motion vectors of the block to determine addresses of valid pixels for the past frame. Selection between the frame buffers is shown in Table 2 below:

TABLE 2

| Frame to be processed | F1 | F2 | F3 | F4 | F5 | ... |
|---|---|---|---|---|---|---|
| (0 − b)th frame (selected) | FB1 | FB2 | FB3 | FB4 | FB5 | ... |
| . | | | | | | |
| . | | | | | | |
| . | | | | | | |
| (0 − 2)th frame | FB(b − 1) | FB(b) | FB(b + 1) | FB(b + 2) | FB(b + 3) | |
| (0 − 1)th frame | FB(b) | FB(b + 1) | FB(b + 2) | FB(b + 3) | FB(b + 4) | |
| Present frame | FB(b + 1) | FB(b + 2) | FB(b + 3) | FB(b + 4) | FB(b + 5) | ... |
| (1 + 1)th frame | FB(b + 2) | FB(b + 3) | FB(b + 4) | FB(b + 5) | FB(b + 6) | ... |
| (1 + 2)th frame | FB(b + 3) | FB(b + 4) | FB(b + 5) | FB(b + 6) | FB(b + 7) | ... |
| . | | | | | | |
| . | | | | | | |
| . | | | | | | |
| (1 + f)th frame | FB(b + f + 1) | FB1 | FB2 | FB3 | FB4 | ... |

In processing the first frame, the pixel value of the present frame is written into the frame buffer FB(b+1). The pixel value of the future frame is written into the frame buffers FB(b+2) to FB(f+b+1). On the other hand, the pixel value for the past frame is written into the frame buffers FB1 to FB(b). Writing of the past (0−1)th to (0−b)th frames is similar to that when the motion vector is inverted in both x- and y-directions. These motion vectors will be referred to as backward motion vectors.

Figure 11:
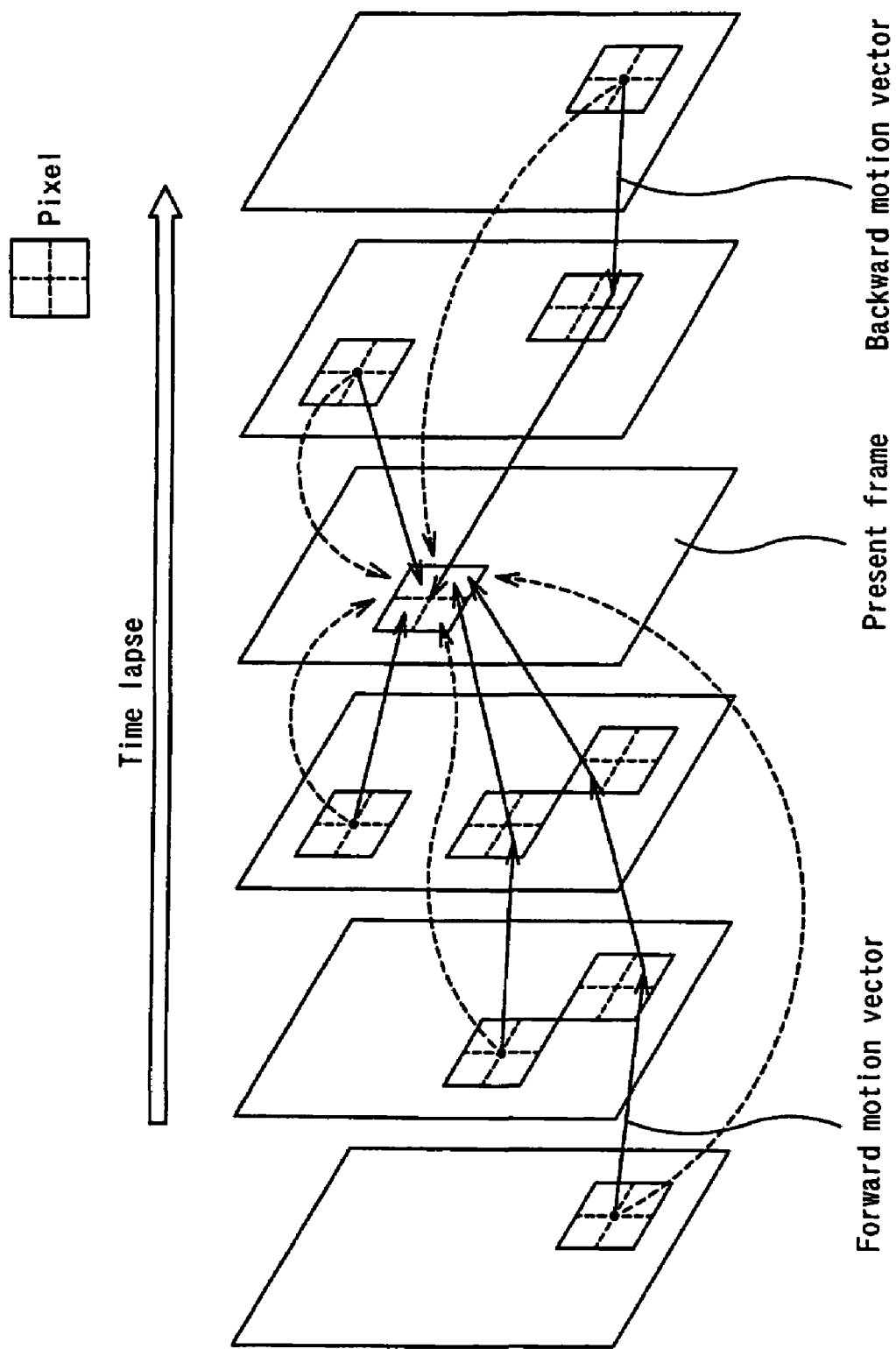
FIG. 11 explains interpolation using only a forward mapping in the conventional moving picture converter.

FIG. 11 explains interpolation of the past and future frames to present frame in the conventional moving picture converter 120. In FIG. 11, the arrow pointing toward the right of the drawing indicates a group Vn of motion vectors directed in the forward direction of time lapse and the arrow pointing to the left of the drawing indicates a group Vr of motion vectors directed in a direction opposite to the time lapse in which the motion vector group Vn has been generated. The moving picture converter 120 produces an image through a time-directional interpolation using both the motion picture groups, that is, it renders the image. This rendering is a forward-mapping rendering which starts with a past or future frame other than any present frame and in which the motion vectors are processed toward the present frame. With this type of rendering, however, even a small error of the motion vector will result in correspondence with improper pixels beyond the pixel boundary and block boundary as the case may be. In such a case, since the resultant pixel value is improper, a part of an image will possibly be distorted or false-colored. Also, when invalid pixels which will not be mapped develop from a near frame, blurring will take place in the vicinity of the image because the interpolation is made only in the spatial direction within a frame.

Figure 12:
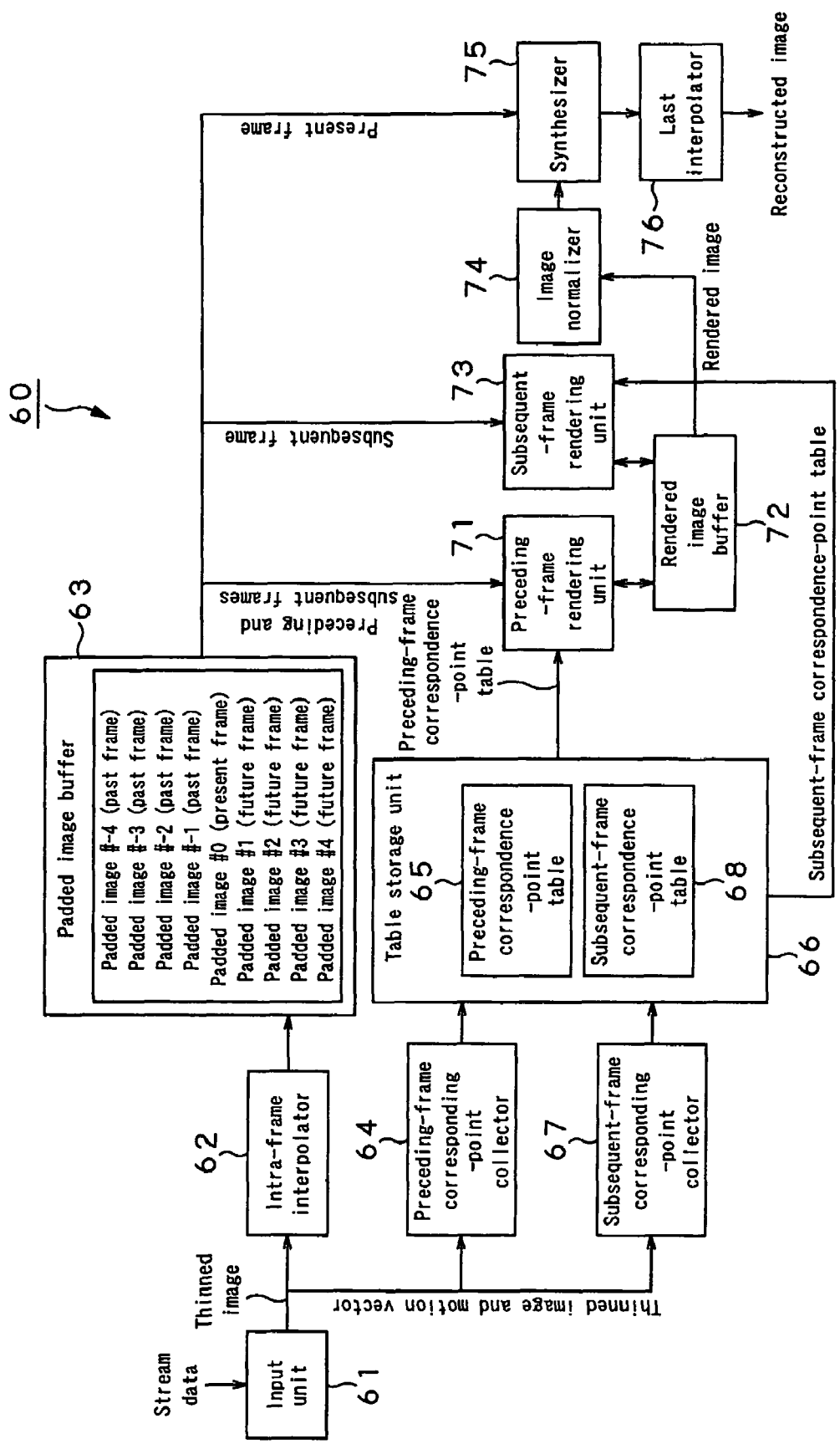
FIG. 12 is a schematic block diagram of the moving picture converter according to the present invention.

(3) Moving picture converting apparatus and method according to the present invention As above, the conventional moving picture converter 120 will possibly produce a distorted or blurry image. On this account, the moving picture converter 60 solves this problem as will be described below:

FIG. 12 shows the construction of the moving picture converter 60. The moving picture converter 60 is supplied with thinned images and motion vectors and traces pixels in four frames before and after a present frame, corresponding to pixels in the latter, according to the motion vectors to restore the pixels in the present frame on the basis of the pixels corresponding to those in the four frames before and after the present frame.

Note that it is assumed that the motion vectors used in this embodiment are forward motion vectors. The forward motion vectors are directed in a direction of time lapse from the past to future. With the forward motion vectors, it is possible to trace pixels in a sequence from a past frame to a future frame. The moving picture converter 60 makes forward rendering in which pixels in the present frame corresponding to valid ones of a past frame are traced to restore the pixels in the present frame on the basis of the valid ones of the past frame and backward rendering in which valid pixels in a future frame corresponding to pixels in a present frame are traced to restore the pixels in the present frame on the basis of the valid pixels in the future frame.

The forward rendering and backward rendering start tracing at different points. Since in the forward rendering, pixels in the present frame are traced based on those of an other frame than the present one, the center of pixel in the present frame is not always reached by the tracing and thus corresponding pixels cannot be determined before all pixels have been traced. On the other hand, since the backward rendering is stared at the center of a pixel in the present frame, corresponding pixels are sequentially determined in the process of tracing.

The backward motion vector is opposite to the time lapse from the future to the past. In the forward rendering, pixels are traced in a direction from the future frame to the past, opposite to the pixel tracing direction in this embodiment, according to the backward motion vector. In the backward rendering, pixels are traced in a direction from the past frame to the future frame.

The motion vectors include a forward motion vector, backward motion vector, bidirectional motion vector, etc. and different in direction of tracing from each other. The moving picture conversion according to the present invention can be made with all these motion vectors. The moving picture converter 60 will be explained below which uses the forward motion vector.

As shown in FIG. 12, the moving picture converter 60 includes an intra-frame interpolator 62 that interpolates invalid pixels of a thinned image based on valid pixels existent in identical frames to produce a padded image, a preceding-frame corresponding-point collector 64 to generate a preceding-frame correspondence-point table 65 that is a collection of information on corresponding points in a future frame, corresponding to invalid pixels in a present frame according to the forward motion vector, a subsequent-frame corresponding-point collector 67 to generate a subsequent-frame correspondence-point table 68 that is a collection of information on corresponding points in a future frame, corresponding to invalid pixels in the present frame according to the forward motion vector, a preceding-frame rendering unit 71 to restore invalid pixels in the present frame from valid pixels in a past frame with reference to the preceding-frame correspondence-point table 65, a subsequent-frame rendering unit 73 to restore invalid pixels in the present frame from valid pixels in the future frame with reference to the subsequent-frame correspondence-point table 68, an image normalizer 74 to normalize the scale of the rendered image, a synthesizer 75 to combine the normalized image and padded image with each other, and a last interpolator 76 to interpolate remaining invalid pixels.

The moving picture converter 60 includes an input unit 61 which is supplied with a data stream and outputs a thinned moving picture included in the data stream to the intra-frame interpolator 62 and the thinned moving picture and motion vector to the preceding-frame corresponding-point collector 64 and subsequent-frame corresponding-point collector 67. The data stream is generated by the moving picture converter 10 shown in FIG. 1, for example.

The motion vector is a unidirectional one, namely, the forward motion vector. One motion vector is assigned as a two-dimensional vector to one pixel in one frame of a thinned image. It should be noted that one motion vector may also be assigned to a block composed of a plurality of pixels.

Figure 13:
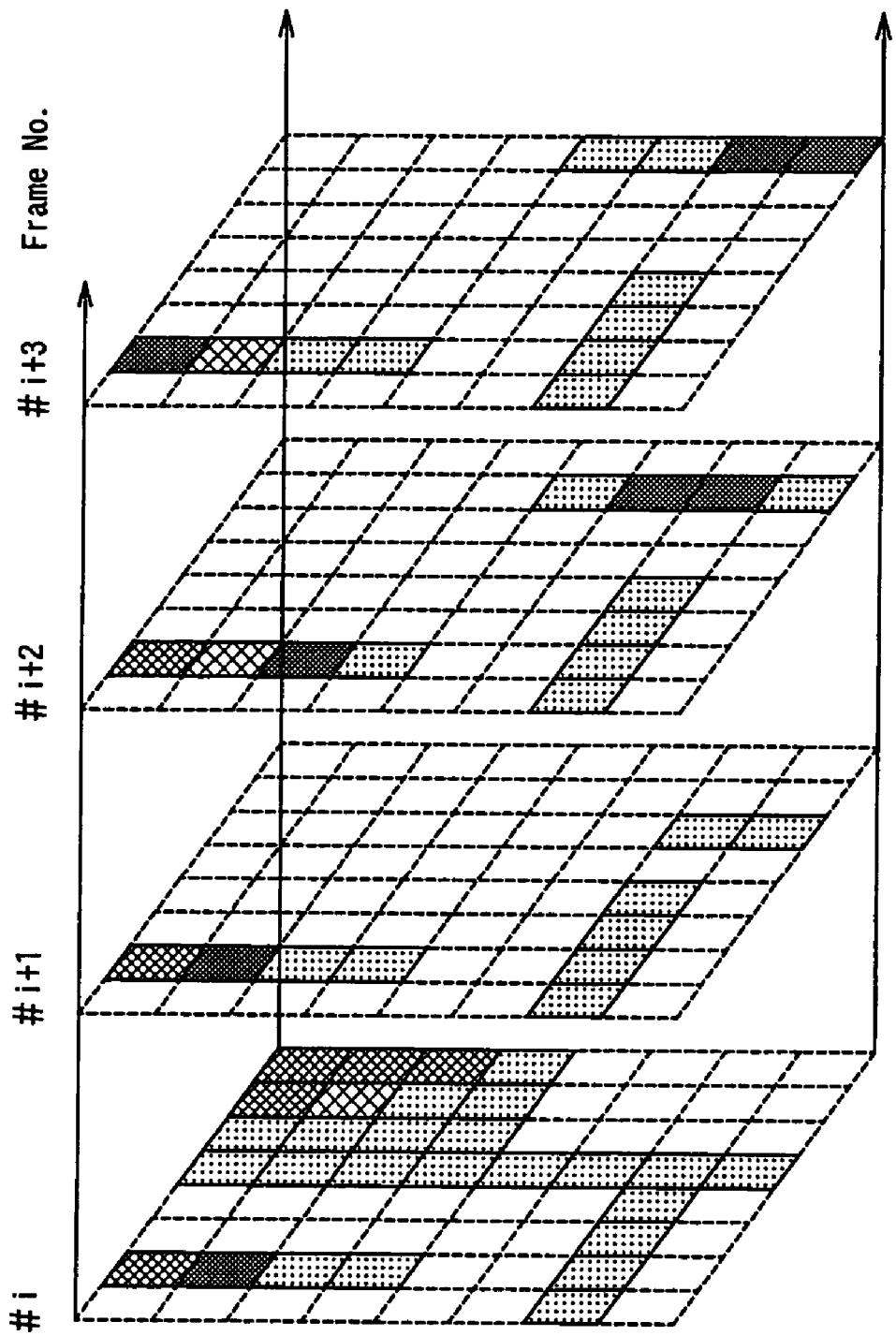
FIG. 13 illustrates four images thinned in the moving picture converter in FIG. 1.
Figure 14:
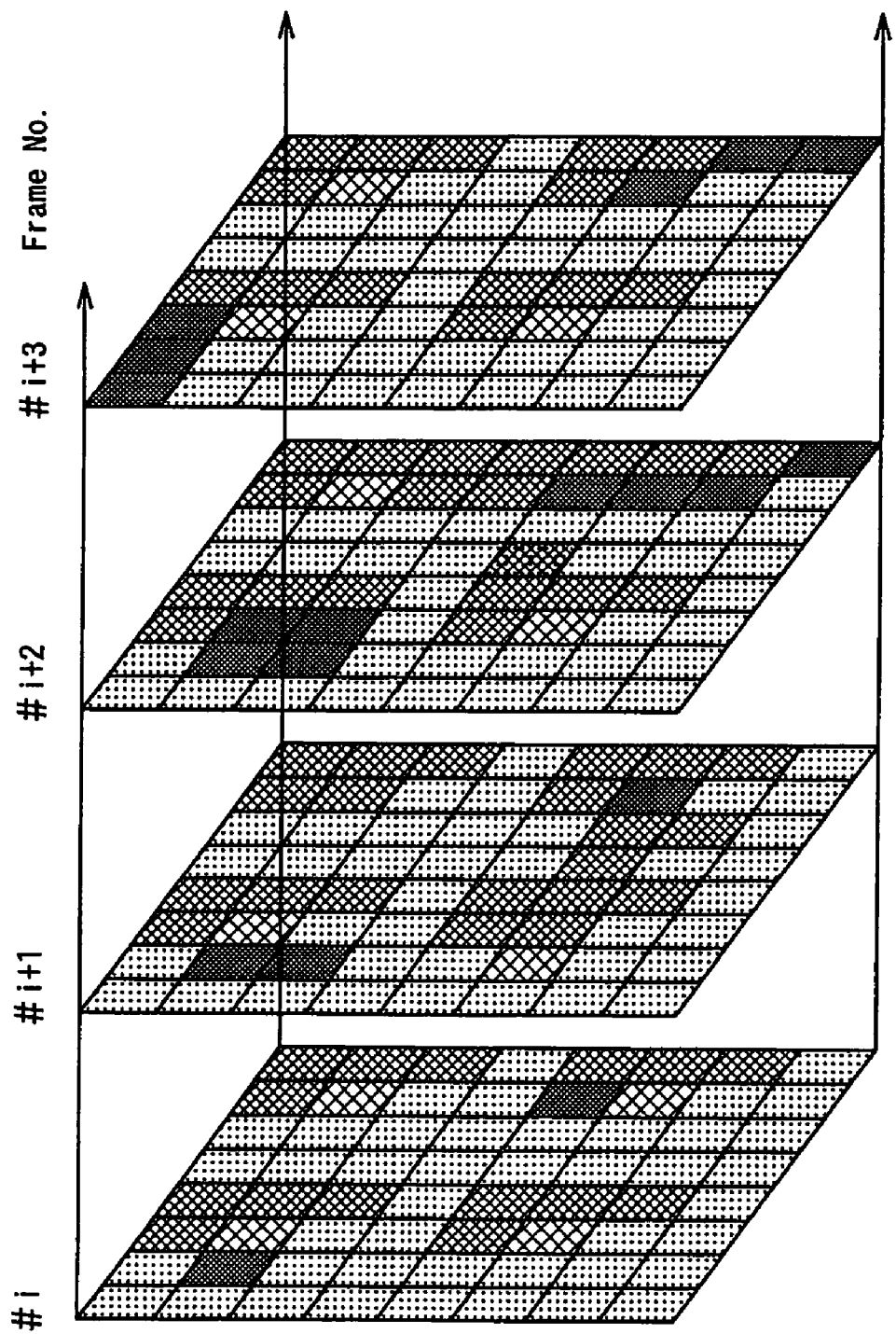
FIG. 14 illustrates a padded image resulted from interframe interpolation of the thinned image.

The intra-frame interpolator 62 makes intra-frame interpolation of thinned images. The thinned image consists of valid and invalid pixels as shown in FIG. 13. The valid pixel has a value, but the invalid pixel has its value thinned. The intra-frame interpolator 62 pads the invalid pixels by interpolating one thinned image in the spatial direction. FIG. 14 illustrates a padded image resulted from the inter-frame interpolation.

This image will be referred to as padded image. The moving picture converter 60 also includes a padded image buffer 63 that stores a maximum of nine padded images. The nine padded images including the present frame to be restored and four frames before and after the present frame.

Figure 15:
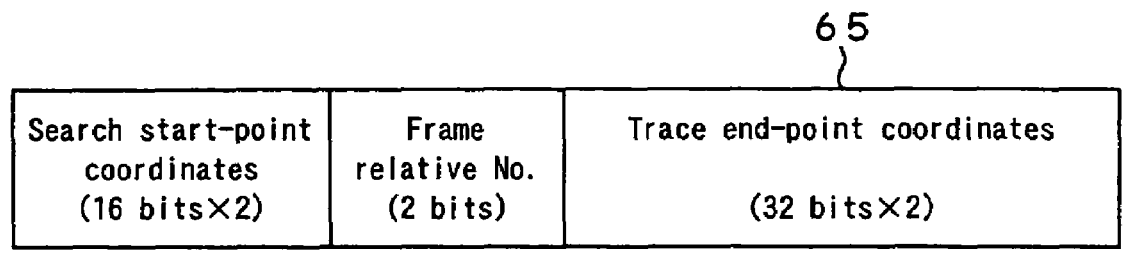
FIG. 15 illustrates the configuration of a preceding-frame correspondence-points table.
Figure 16:
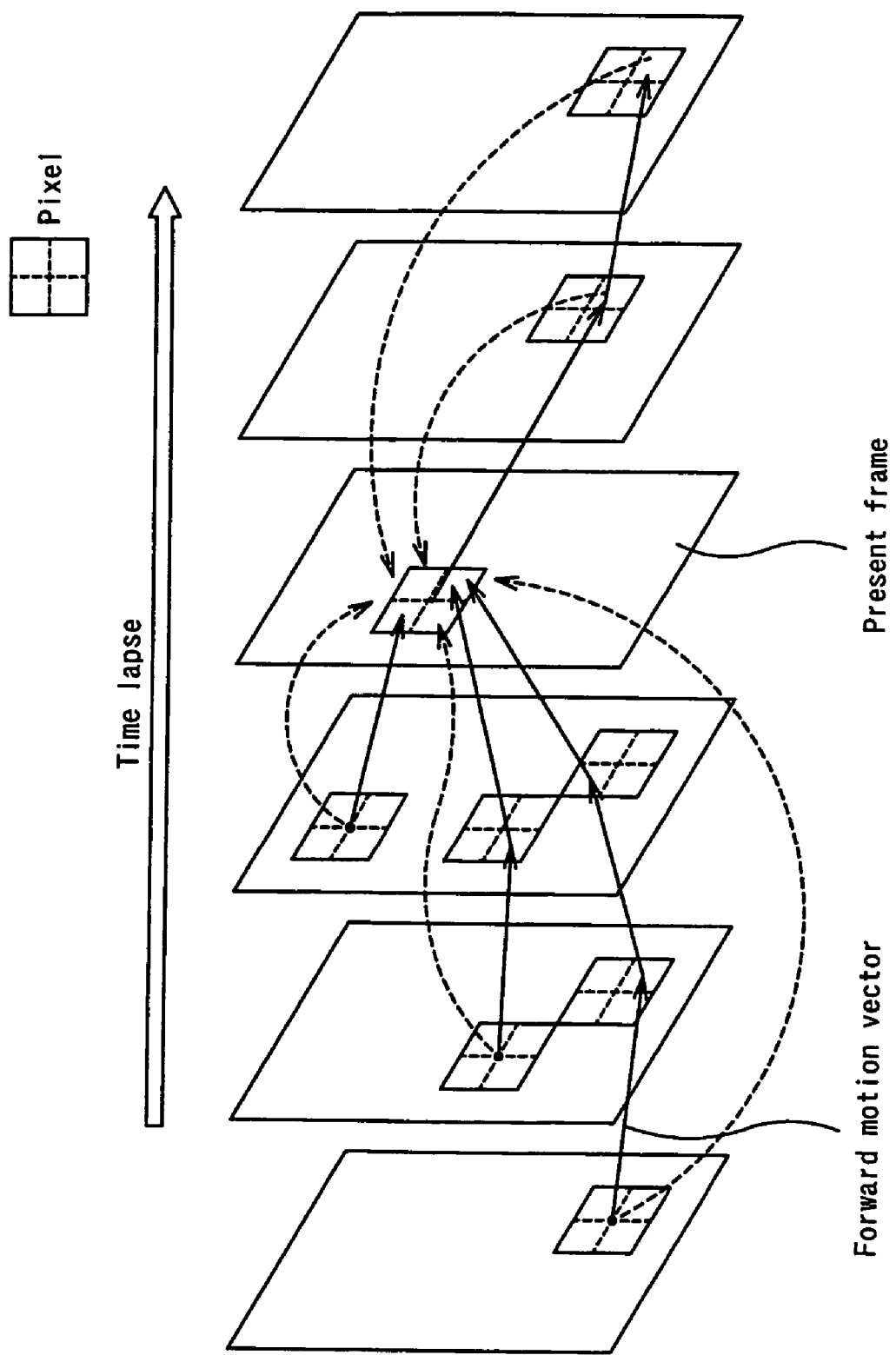
FIG. 16 explains interpolation using a forward mapping and backward mapping in the moving picture converter according to the present invention.

The preceding-frame corresponding-point collector 64 traces valid pixels included in the past frames preceding the present frame according to the motion vectors and forms, in a table storage unit 66, the preceding-frame correspondence-point table 65 that is a collection of information on points in the present frame, corresponding to points in the past frames preceding the present frame. As shown in FIG. 15, trace start-point coordinates, relative numbers of frames including a trace start point and trace end-point coordinates in the present frame are stored in the preceding-frame correspondence-point table 65. FIG. 16 shows tracing made by the preceding-frame corresponding-point collector 64. In the tracing, results of shifting of the valid pixels are traced frame by frame starting at a valid pixel in the preceding-frame according to the forward motion vector, and corresponding-point information such as a trace end-point coordinates in the present frame, trace start point in the preceding frame, relative number of a frame in which the trace start point lies, etc. are stored in the preceding-frame correspondence-point table 65.

In this embodiment, the trace start-point coordinates is represented by an integral-number precision (16 bits) and trace end-point coordinates is represented by a sub-pixel precision (32 bits). Note that even if the valid pixels in the preceding frame are traced starting at the center of a pixel, the trace end point will be off the pixel center. This is because the precision is high for representing a space-directional decentering. In the preceding-frame rendering which will be explained in detail later, calculation of a pixel value with the sub-pixel precision uses a near–4 linear interpolation. Of course, any other higher-order or lower-order interpolation may be used.

The resolution of the preceding-frame correspondence-point table 65 is the same as that of a moving picture not yet thinned. The data mount of the preceding-frame correspondence-point table 65 is proportional with the number of pixels in four preceding frames. More specifically, the data amount per pixel in the preceding frame correspondence-point table 65 will be (No. of preceding frames)×(No. of bits of trace start-point coordinates)+(No. of bits of frame relative number)+(No. of bits of trace end-point coordinates). Also, the data amount per pixel of a moving picture not yet thinned is 24 bits in RGB of 256 gradations.

The trace start-point coordinates is 16 bits ×2 (dimensions) (X and Y coordinates), frame relative number is 2 bits, trace end-point coordinates of a present frame is 32 bits ×2 (dimensions), and pixels are 8 bits ×3 (colors (=RBG)). Division of the data amount per pixel in the preceding frame correspondence-point table 65 by that per pixel of a moving picture not yet thinned results in about 16.3 (=4×(32+2+64)/24). That is, the data amount of the preceding frame correspondence-point table 65 is about 16 times larger than that per image. Since four successive pixels of an actual image are rarely valid, the practical scale factor is smaller than the above.

Figure 17:
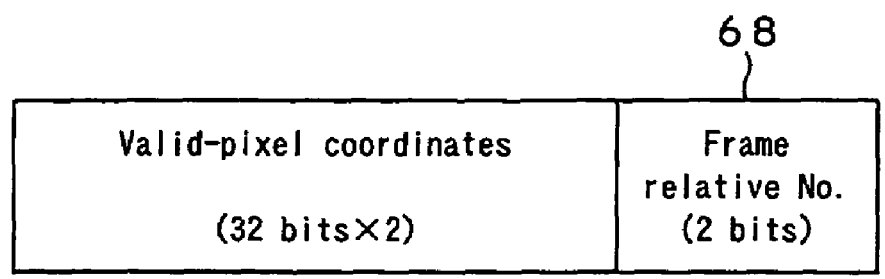
FIG. 17 illustrates a subsequent-frame correspondence-points table.

The preceding frame corresponding-point collector 67 forms, in the table storage unit 66, the preceding frame correspondence-point table 68 that is a collection of information on valid pixels in a subsequent frame, corresponding to invalid pixels of a thinned image in the present frame. As shown in FIG. 17, coordinates of valid pixels in the subsequent frame, corresponding to the invalid pixels in the present frame, relative numbers of frames including the valid pixels, etc. are stored in the subsequent-frame corresponding-point table 68. In the tracing by the subsequent-frame correspondence-point collector 67, pixels are traced frame by frame starting at an invalid pixel in the present frame according to the forward motion vector as shown in FIG. 16. When a valid pixel in the subsequent frame is detected, the coordinate of the detected valid pixel and relative number of the frame including that valid pixel are stored in the subsequent-frame correspondence-point table 68.

According to this embodiment, the coordinate of the detected valid pixel is represented by a sub-pixel precision (32 bits). This is because starting of the tracing at the center of a pixel in the present frame will result in displacement from the pixel center. Also, the resolution of the subsequent-frame correspondence-point table 68 is the same as that of a moving picture not yet thinned. The data amount of the subsequent-frame correspondence-point table 68 is about a half of that of the preceding frame correspondence-point table 65.

The preceding-frame rendering unit 71 accesses a padded image in a past frame and padded image in the present image, stored in the padded frame buffer and makes a preceding-frame rendering in which invalid pixels in the present frame and valid pixel values (RGB) of the past frame are integrated with each other on the basis of the preceding frame correspondence-point table 65.

Figure 18:
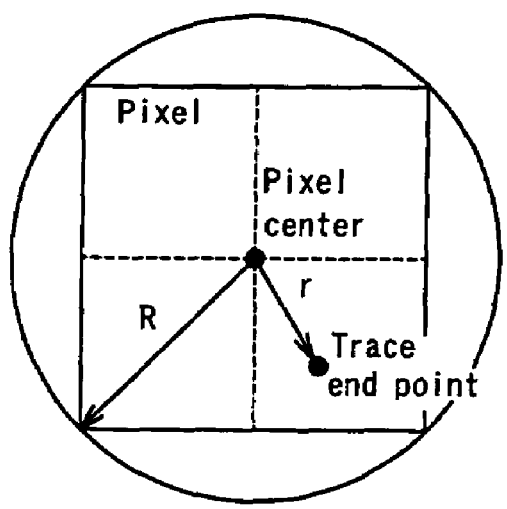
FIG. 18 explains the relation between r and MaxR.

Also, the preceding-frame rendering unit 71 calculates a weighting factor W for normalization of the pixel scale as indicated with the following equation (4) below:

$$W = (1 - f/\text{Max}F) \times (1 - r/\text{Max}R) \quad (4)$$

where $\underline{f}$ (frame distance) is a difference in frame number between the frame and a frame including the trace start point, MaxF is a value of the maximum frame distance +1 (=5 since four past frames are to be processed), $\underline{r}$ is a distance from the center of a pixel including the trace end point to the trace end point, and MaxR is a radius of a circle circumscribing one pixel including the moving picture. FIG. 18 explains the relation between $\underline{r}$ and MaxR.

In the above equation (4), a term in the former parentheses is to adjust the contribution corresponding to a frame distance and a term in the latter parentheses is to adjust the contribution corresponding to a space-directional distance between the trace end point and pixel center. The term in the former parentheses increases the contribution of the trace start point to the pixel value in the present frame as the trace start point is nearer to the present frame, while the term in the latter parentheses increases the contribution of the trace start point to the pixel value in the present frame as the trace end point is nearer to the pixel center.

When the past frame includes a plurality of valid pixels corresponding to invalid pixels in the present frame, the preceding-frame rendering unit 71 will determine the total of results of multiplication of the RGB value of each of the corresponding valid pixels by the weighting factor W (as given by the equation (4)) and total of these weighting coefficients W per invalid pixel, and writes them in the respective pixels in a rendered image buffer 72 also included in the moving picture converter 60.

The RGB and W are calculated as given by the following equations (5):

$$R' = \Sigma(Wi \times Ri)$$

$$G' = \Sigma(Wi \times Gi)$$

$$B' = \Sigma(Wi \times Bi)$$

$$W' = \Sigma Wi \text{ (}\underline{i}\text{ is a subscript indicating a valid pixel)} \quad (5)$$

The preceding-frame rendering unit 71 combines the preceding frame rendered RGB image and weighting factor W, and outputs the preceding frame rendered image having four components RGBW as one pixel to the rendered image buffer 72. It should be noted that the weighting factor W is calculated with a high precision, for example, by a single-precision floating-point operations with more than 32 bits or the like.

On the other hand, the subsequent-frame rendering unit 73 accesses the preceding frame-rendered image stored in the rendered image buffer 72 and padded image in a future frame stored in the padded frame buffer and makes subsequent-frame rendering in which a pixel value (RGB) in the preceding frame rendered image, in which an invalid pixel in the present frame lies, and a valid pixel in the future frame are integrated together according to the subsequent-frame correspondence-point table 68.

Also, the subsequent-frame rendering unit 73 calculates a weighting factor W for normalization of a pixel scale by integration. The weighting factor W in the subsequent-frame rendering is calculated by the following equation (6):

$$W = (1 - f/\mathrm{Max}F) \quad (6)$$

where $f$ (frame distance) is a difference in frame number between the frame and a future frame including a valid pixel, and MaxF is a value of the maximum frame distance +1 (=5 since four future frames are to be processed).

The equation (6) is the same as the former half of the above equation (5). It adjusts the contribution corresponding to a frame distance. The contribution of the trace end point to the pixel value in the present frame as the trace start point is nearer to the preset frame.

When the future frame includes a plurality of valid pixels corresponding to an invalid pixel in the present frame, the subsequent-frame rendering unit 73 will determine the total of results of multiplication of the RGB value of each of the corresponding valid pixels by the weighting factor W (as given by the equation (6)) and total of these weighting coefficients W per invalid pixel, and adds them to the present pixels in a corresponding image in the rendered image buffer 72.

The RGB and W are calculated as given by the following equations (7):

$$R'' = R' + \Sigma(Wi \times Ri)$$

$$G'' = G' + \Sigma(Wi \times Gi)$$

$$B'' = B' + \Sigma(Wi \times Bi)$$

$$W'' = W + \Sigma Wi \; (\underline{i} \text{ is a subscript indicating a valid pixel}) \quad (7)$$

The subsequent-frame rendering unit 73 combines the preceding- and subsequent-frame-rendered RGB image and weighting factor W with each other, and outputs the rendered image having three components RGB as one pixel to the image normalizer 74.

The pixel value (RGB) used in the preceding-frame rendering and subsequent-frame rendering should be a pixel value at coordinates of a sub-pixel precision. To calculate the pixel value, the subsequent-frame rendering unit 73 and preceding-frame rendering unit 71 use the four-near linear interpolation, 2-near linear interpolation, nearest interpolation or the like. In the interpolation, the single-precision floating point is used for the arithmetic.

In the above rendering, coordinates of a pixel is defined with the sub-pixel precision. So, the pixel precision can be improved and error in the integration is reduced. Thus, the restored image will be improved in quality.

Further, since the padded image, preceding-frame correspondence-point table 65 and subsequent-frame correspondence-point table 68 used in the moving picture converter 60 are of the same resolution as that of a moving picture not yet thinned, the number of times of access to images can be smaller and time taken from the rendering be shorter than in the conventional moving picture converter 120 using the buffer having a capacity s×s times larger than the input image size.

The image normalizer 74 accesses the rendered image buffer 72 and divides each RGB value of the rendered image by the weighting factor W to produce an image normalized to the original pixel scale.

The synthesizer 75 blends two images, that is, an image normalized by the image normalizer 74 and a padded image in the present frame stored in the padded image buffer 63 together at a ratio of 1:1. Thus, an equivalent interpolation can be made with a total of three axes including an inter-frame time axis and two intra-frame axes. An image may be synthesized through pixel selection by blending pixels at a weighted ratio of 7:3, for example, or by outputting invalid pixels padded only by the contribution of the time-axial interpolation or invalid pixels padded only by the intra-frame interpolation are outputted as they are and blending blank pixels padded by both the interpolation at a weighted ratio.

The last interpolator 76 makes intra-frame interpolation of an output image from the synthesizer 75 with a similar interpolation to that made in the aforementioned intra-frame interpolator 62. The last interpolator 76 is to completely pad invalid pixels in the present frame, which could not be padded even by the rendering such as the first intra-frame interpolation, preceding-frame rendering, subsequent-frame rendering or the like, to determine colors of all the pixels. The last interpolator 76 outputs a reconstructed image resulted from approximation of a thinned image to a thinned one.

In the moving picture converter 60 according to the present invention, there are generated the preceding frame correspondence-point table 65 as a connection of information on valid pixels in a past frame, corresponding to invalid pixels in a thinned image, and the subsequent-frame correspondence-point table 68 as a collection of information on valid pixels in a future frame, corresponding to invalid pixels in the thinned image, and the present frame having been subjected to an intra-frame interpolation is subjected to an inter-frame interpolation with reference to the tables thus generated. Thus, the number of times of access to images can be smaller and time taken for the rendering be shorter than in the conventional moving picture converter 120.

Also, since a pixel value is calculated with a sub-pixel precision, it is possible to avoid incorrect correspondence due to a small error of the motion vector and thus prevent an image distortion and false coloring.

Further, the preceding- and subsequent-frame correspondence-point tables 65 and 68 may be of less data size than the conventional buffer having a capacity s×s times larger than the input image size, so that a memory having a smaller capacity may be used.

Note that although in the moving picture converter 60 according to the present invention, it is assumed that the motion vector is a unidirectional one directed from the past to future (forward motion vector), the motion vector may be a unidirectional one directed from the future to past (backward motion vector) or a bidirectional one directed from the past to future and from the future to past.

In case the bidirectional motion vector is used, the preceding frame correspondence-point collector 64 traces valid pixels in a past frame, corresponding to invalid pixels in a present frame, according to the backward motion vector, while the subsequent-frame correspondence-point collector 67 traces valid pixels in a future frame, corresponding to invalid pixels in the present frame, according to the forward motion vector.

By making both the backward rendering with the bidirectional motion vector, it is possible to render a restored image with an improved precision. Also, by making only the backward rendering with the bidirectional motion vector, it is possible to make calculation at a higher speed than in the moving picture converter 60 using the combination of the forward rendering and backward rendering.

Also, rendering the pixel value (RGB) and integration of weighting factor may be done while tracing the subsequent frame with omission of the generation of the subsequent-frame correspondence-point table. Thus, the calculations for the rendering and weighting-factor calculation can be more optimized.

It should be understood by those skilled in the art that various modifications, combinations, sub-combinations and alterations may occur depending on design requirements and other factors insofar as they are within the scope of the appended claims or the equivalents thereof.

What is claimed is:

1. A moving picture converting apparatus for reconstructing an original moving picture from compressed moving-picture data, the apparatus comprising:

an input unit to receive compressed moving-picture data including a thinned image consisting of invalid pixels having values reduced and valid pixels keeping their values and a forward motion vector incident to the thinned image;

an intra-frame interpolator for interpolating the invalid pixels in a present frame to be restored on the basis of the valid pixels of the thinned image in the present frame to produce a padded image; and a frame rendering unit to produce a rendered image by making preceding-frame rendering to restore pixels of the padded image on the basis of valid pixels in a preceding frame as a past frame preceding the present frame and subsequent-frame rendering to restore pixels of the padded image on the basis of valid pixels in a subsequent frame as a future frame subsequent to the present frame, the frame rendering unit making the preceding-frame rendering to restore a pixel at an end point of tracing in the padded image on the basis of valid pixels detected in the process of tracing, started at a pixel in the preceding frame, in a sequence from the preceding frame to the present frame according to the forward motion vector, and the subsequent-frame rendering to restore a pixel at the start point of the tracing in the padded image on the basis of valid pixels detected in the process of tracing, started at an invalid pixel of the padded image in the present frame, in a sequence from the present frame to the subsequent frame according to the forward motion vector.

2. The apparatus according to claim 1, further comprising:

a preceding frame correspondence-point collector to trace pixels in the preceding frame according to the forward motion vector and generate a preceding frame correspondence-point table as a collection of information on valid pixels in the preceding frame, corresponding to the pixels in the present frame; and a subsequent-frame correspondence-point collector to trace, starting at an invalid pixels in the present frame, the subsequent frame according to the forward motion vector and generate a subsequent-frame correspondence-point table as a collection of information on valid pixels in the subsequent frame, corresponding to the pixels in the present frame, the frame rendering unit making the preceding-frame rendering by acquiring the information on the valid pixels in the preceding frame, corresponding to the pixels in the present frame on the basis of the preceding frame correspondence-point table, and the subsequent-frame rendering by acquiring the information on the valid pixels in the subsequent frame, corresponding to the pixels in the present frame on the basis of the subsequent-frame correspondence-point table.

3. The apparatus according to claim 1, wherein the frame rendering unit includes an image normalizer that normalizes each pixel of the rendered image.

4. The apparatus according to claim 1, further comprising a synthesizer that combines together the rendered image and padded image interpolated by the intra-frame interpolator.

5. The apparatus according to claim 4, further comprising a last interpolator that interpolates invalid pixels remaining in an image output from the synthesizer by valid pixels in the frame of the output image.

6. The apparatus according to claim 3, wherein the frame rendering unit calculates, for each of the pixels in the present frame, an integral weighting factor resulted from adding up weighting factors corresponding to a distance between the present frame and ones of the preceding and subsequent frames which include valid pixels corresponding to the pixels in the present frame, and the image normalizer divides each pixel value of the rendered image by the integral weighting factor.

7. A moving picture converting method of reconstructing an original picture from compressed moving-picture data, the method comprising the steps of:

receiving compressed moving-picture data including a thinned image consisting of invalid pixels having values reduced and valid pixels keeping their values and a forward motion vector incident to the thinned image;

interpolating the invalid pixels in a present frame to be restored on the basis of the valid pixels of the thinned image in the present frame to produce a padded image; and producing a rendered image by making preceding-frame rendering to restore pixels of the padded image on the basis of valid pixels in a preceding frame as a past frame in relation to the present frame and subsequent-frame rendering to restore pixels of the padded image on the basis of valid pixels in the subsequent frame as a future frame in relation to the present frame, in the preceding-frame rendering, a pixel at an end point of the tracing in the padded image being restored based on valid pixels detected in the process of tracing, started at a pixel in the preceding frame, in a sequence from the preceding frame to the present frame according to the forward motion vector, and in the subsequent-frame rendering, a pixel at the start point of the tracing in the padded image being restored based on valid pixels detected in the process of tracing, started at an invalid pixel of the padded image in the present frame, in a sequence from the present frame to the subsequent frame according to the forward motion vector.

8. A computer readable storage medium storing a computer program allowing a computer to carry out a moving picture converting method, the program comprising the steps of:

receiving compressed moving-picture data including a thinned image consisting of invalid pixels having values reduced and valid pixels keeping their values and a forward motion vector incident to the thinned image;

making intra-frame interpolation of the invalid pixels in a present frame to be restored on the basis of the valid pixels of the thinned image in the present frame to produce a padded image; and producing a rendered image by making preceding-frame rendering to restore pixels of the padded image on the basis of valid pixels in a preceding frame as a past frame in relation to the present frame and subsequent-frame rendering to restore pixels of the padded image on the basis of valid pixels in the subsequent frame as a future frame in relation to the present frame, in the preceding-frame rendering, a pixel at an end point of the tracing in the padded image being restored based on valid pixels detected in the process of tracing, started at a pixel in the preceding frame, in a sequence from the preceding frame to the present frame according to the forward motion vector, and in the subsequent-frame rendering, a pixel at the start point of the tracing in the padded image being restored based on valid pixels detected in the process of tracing, started at an invalid pixel of the padded image in the present frame, in a sequence from the present frame to the subsequent frame according to the forward motion vector.

9. A moving picture converting apparatus for reconstructing an original moving picture from compressed moving-picture data, the apparatus comprising:

an input unit to receive compressed moving-picture data including a thinned image consisting of invalid pixels having values reduced and valid pixels keeping their values and a bidirectional motion vector incident to the thinned image;

an intra-frame interpolator for interpolating the invalid pixels in a present frame to be restored on the basis of the valid pixels of the thinned image in the present frame to produce a padded image; and a frame rendering unit to produce a rendered image by making preceding-frame rendering to restore pixels of the padded image on the basis of valid pixels in a preceding frame as a past frame in relation to the present-frame rendering and subsequent-frame rendering to restore pixels of the padded image on the basis of valid pixels in the subsequent frame as a future frame in relation to the present frame, the frame rendering unit making the preceding-frame rendering to restore a pixel at an end point of tracing in the padded image on the basis of valid pixels detected in the process of tracing, started at an valid pixel of the padded image in the present frame, in a sequence from the preceding frame to the present frame according to a backward motion vector included in the bidirectional motion vector, and the subsequent-frame rendering to restore a pixel at the start point of tracing in the padded image on the basis of valid pixels detected in the process of tracing, started at an invalid pixel of the padded image in the present frame, in a sequence from the present frame to the subsequent frame according to a forward motion vector included in the bidirectional motion vector.

* * * * *